US011373355B2

(12) United States Patent
Nakadai

(10) Patent No.: US 11,373,355 B2
(45) Date of Patent: Jun. 28, 2022

(54) ACOUSTIC SCENE RECONSTRUCTION DEVICE, ACOUSTIC SCENE RECONSTRUCTION METHOD, AND PROGRAM

(71) Applicant: HONDA MOTOR CO., LTD., Tokyo (JP)

(72) Inventor: Kazuhiro Nakadai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 563 days.

(21) Appl. No.: 16/536,570

(22) Filed: Aug. 9, 2019

(65) Prior Publication Data

US 2020/0066023 A1 Feb. 27, 2020

(30) Foreign Application Priority Data

Aug. 24, 2018 (JP) .............................. JP2018-157166

(51) Int. Cl.
*G06T 15/00* (2011.01)
*G10L 25/51* (2013.01)
(Continued)

(52) U.S. Cl.
CPC ............ *G06T 15/00* (2013.01); *G10L 21/028* (2013.01); *G10L 25/51* (2013.01); *H04R 1/406* (2013.01);
(Continued)

(58) Field of Classification Search
CPC combination set(s) only.
See application file for complete search history.

(56) References Cited

U.S. PATENT DOCUMENTS 8,183,997 B1 * 5/2012 Wong .................... H04R 29/008
367/199
10,770,091 B2 * 9/2020 Kleijn ................... G10L 21/028

FOREIGN PATENT DOCUMENTS

CN 104995679 A * 10/2015 ........... G06K 9/0051
JP 2002-304191 10/2002
(Continued)

OTHER PUBLICATIONS

Japanese Office Action dated Sep. 28, 2021, English translation included, 5 pages.
(Continued)

*Primary Examiner* — Mohammad K Islam
(74) *Attorney, Agent, or Firm* — Rankin, Hill & Clark LLP

(57) ABSTRACT

An acoustic scene reconstruction device includes: a sound source localization and separation unit configured to perform sound source localization and sound source separation from a collected sound signal; an identification unit configured to identify a kind of a sound source contained in the sound signal; an analysis processing unit configured to estimate a position of the sound source based on a result obtained through the sound source localization and the sound source separation and a result obtained through the identification, select a separation sound and generate visualization information; and a visualization processing unit configured to generate an image corresponding to the sound source is displayed at the estimated position of the sound source by using the visualization information and the separation sound and generate a sound in which the separation sound is reproduced at the estimated position of the sound source.

7 Claims, 24 Drawing Sheets

(51) Int. Cl.
  *G10L 21/028* (2013.01)
  *H04R 3/00* (2006.01)
  *H04R 1/40* (2006.01)
  *A01K 45/00* (2006.01)
(52) U.S. Cl.
  CPC .............. *H04R 3/005* (2013.01); *A01K 45/00* (2013.01); *G06T 2200/24* (2013.01)

(56) References Cited

FOREIGN PATENT DOCUMENTS

| | | | | |
|---|---|---|---|---|
| JP | 2004-007211 | 1/2004 | | |
| JP | 2010-152149 | 7/2010 | | |
| JP | 2012-211768 | 11/2012 | | |
| JP | 2013-008031 | 1/2013 | | |
| JP | 2013-106298 | 5/2013 | | |
| JP | 2016-050872 | 4/2016 | | |
| JP | 2017040794 A * | 2/2017 | ............ | G10L 25/27 |
| JP | 2017-147504 | 8/2017 | | |
| JP | 2018-040848 | 3/2018 | | |
| WO | WO-2014191798 A1 * | 12/2014 | ........... | G10K 11/175 |
| WO | 2017/098772 | 6/2017 | | |

OTHER PUBLICATIONS

K. Nakadai, H. G. Okuno, and T. Mizumoto, "Development, Deployment and Applications of Robot Audition Open Source Software HARK", Journal of Robotics and Mechatronics, vol. 29, No. 1, pp. 16-25, 2017, 10 pages.

\* cited by examiner

| No. | 1 | 2 | 3 | 4 |
|---|---|---|---|---|
| MIC ARRAY NAME | T3 | H1 | T2 | T1 |
| x [m] | −7.3799 | −14.6075 | −6.53442 | 0 |
| y [m] | 7.765218 | −0.49033 | −13.567 | 0 |
| z [m] | 3.01621 | 2.855006 | 1.838746 | 1.3 |

FIG. 18

| |
|---|
| ELEMENT NAME |
| FORMAT VERSION NUMBER |
| RECORDING START DATE: YYYY-MM-DD |
| RECORDING START TIME: HH:MM:SS |
| RECORDING PLACE |
| MIC ARRAY MODEL NAME |
| INFORMATION REGARDING EACH MIC ARRAY: <br><br> · SERIAL NUMBER OF EACH MIC ARRAY <br> · NAME <br> · INSTALLATION POSITION (x, y, z) [m] |
| SAMPLING FREQUENCY OF RECORDED SOUND DATA fs[Hz] |
| NUMBER OF BITS OF RECORDED SOUND DATA [bit/sample] |
| EVENT DATA UPDATING FREQUENCY [frame/sec] |

*FIG. 19*

| ELEMENT NAME |
|---|
| FRAME NUMBER |
| INFORMATION REGARDING EACH BIRD:<br>· POSITION ESTIMATION SOUND SOURCE ID<br><br>· KIND OF BIRD<br>· CRY WAY OF BIRD<br>· BIRD COORDINATES x [m]<br>· BIRD COORDINATES y [m]<br>· BIRD COORDINATES z [m]<br>· BIRD ROLL ANGLE [deg]<br><br>· BIRD PITCH ANGLE [deg]<br><br>· BIRD YAW ANGLE [deg]<br><br><br>· PRESENCE OR ABSENCE OF BIRD CRY<br><br><br>· PRESENCE OR ABSENCE OF BIRD FLUTTER |

*FIG. 20*

| NUMBER | WILD BIRD NAME: JAPANESE NAME | WILD BIRD NAME: ENGLISH NAME |
|---|---|---|
| 0 | (不明) | (Unknown) |
| 1 | ウグイス | Japanese Bush Warbler |
| 2 | ハシボソガラス | Carrion Crow |
| 3 | カワセミ | Common Kingfisher |
| 4 | カワラヒワ | Oriental Greenfinch |
| 5 | キジバト | Oriental Turtle Dove |
| 6 | シジュウカラ | Japanese Tit |
| 7 | スズメ | Tree Sparrow |
| 8 | ツバメ | House Swallow |
| 9 | ハクセキレイ | White Wagtail |
| 10 | ヒヨドリ | Brown-eared Bulbul |
| 11 | ムクドリ | Grey Starling |
| 12 | メジロ | Japanese White-eye |
| 13 | アオジ | Black-faced Bunting |
| 14 | オナガ | Azure-winged Magpie |
| 15 | キジ | Japanese Green pheasant |
| 16 | コゲラ | Japanese Pygmy Woodpecker |
| 17 | コジュケイ | Bamboo Partridge |
| 18 | ツグミ | Dusky Thrush |
| 19 | ハシブトガラス | Jungle Crow |
| 20 | ホオジロ | Siberian Meadow Bunting |
| 21 | ヤマガラ | Varied Tit |
| 22〜998 | (RESERVED REGIONS: FOR WILD BIRDS) | |
| 999 | OTHER WILD BIRD SOUNDS: CAR AND THE LIKE | |

| NUMBER | CRY WAY: JAPANESE NAME | CRY WAY: ENGLISH NAME |
|---|---|---|
| 0 | (不明) | (Unknown) |
| 1 | 地鳴き | Call |
| 2 | さえずり | Song |
| 3 | 谷渡り | Valley to valley |
| 4 | 威嚇 | Threat |
| 5 | 警戒声 | Alarm call |
| 6 | ドラミング | Drumming |
| 7～998 | (RESERVED REGIONS: FOR WILD BIRDS) | |

FIG. 23

| Correct label \ Identification | BIRD: JAPANESE BUSH WARBLER | BIRD: CROW | BIRD: OTHERS | CAR | OTHERS | JAPANESE BUSH WARBLER VALLEY-TO-VALLEY | COMMON KINGFISHER | JAPANESE TIT, SONG | JAPANESE TIT, CALL | TREE SPARROW | BROWN-EARED BULBUL | GREY STARLING | NUMBER OF CORRECT FRAMES |
|---|---|---|---|---|---|---|---|---|---|---|---|---|---|
| BIRD: JAPANESE BUSH WARBLER | 5453 | 27 | 250 | 1796 | 234 | 33 | 0 | 93 | 0 | 7 | 575 | 6 | 8474 |
| BIRD: CROW | 109 | 213 | 24 | 130 | 14 | 3 | 0 | 11 | 0 | 2 | 42 | 0 | 548 |
| BIRD: OTHERS | 453 | 9 | 1021 | 698 | 93 | 34 | 5 | 121 | 2 | 20 | 526 | 1 | 2983 |
| CAR | 480 | 7 | 64 | 27737 | 390 | 11 | 5 | 29 | 0 | 1 | 307 | 56 | 29087 |
| OTHERS | 257 | 3 | 25 | 945 | 1287 | 5 | 2 | 14 | 0 | 1 | 115 | 1 | 2655 |
| JAPANESE BUSH WARBLER VALLEY-TO-VALLEY | 88 | 4 | 75 | 28 | 15 | 541 | 1 | 0 | 0 | 5 | 92 | 0 | 849 |
| COMMON KINGFISHER | 5 | 0 | 3 | 52 | 4 | 0 | 405 | 1 | 0 | 0 | 10 | 0 | 480 |
| JAPANESE TIT, SONG | 191 | 4 | 222 | 308 | 21 | 2 | 1 | 1751 | 2 | 4 | 206 | 0 | 2712 |
| JAPANESE TIT, CALL | 13 | 0 | 5 | 9 | 3 | 4 | 0 | 2 | 35 | 0 | 5 | 0 | 72 |
| TREE SPARROW | 68 | 1 | 54 | 10 | 6 | 52 | 9 | 25 | 2 | 184 | 165 | 0 | 519 |
| BROWN-EARED BULBUL | 854 | 16 | 392 | 1341 | 240 | 0 | 0 | 157 | 4 | 67 | 12630 | 13 | 15775 |
| GREY STARLING | 0 | 0 | 1 | 107 | 5 | 4 | 0 | 0 | 0 | 1 | 10 | 34 | 158 |
| NUMBER OF RECOGNIZED FRAMES | 7971 | 284 | 2136 | 33161 | 2312 | 685 | 428 | 2204 | 45 | 292 | 14683 | 111 | |

FIG. 25

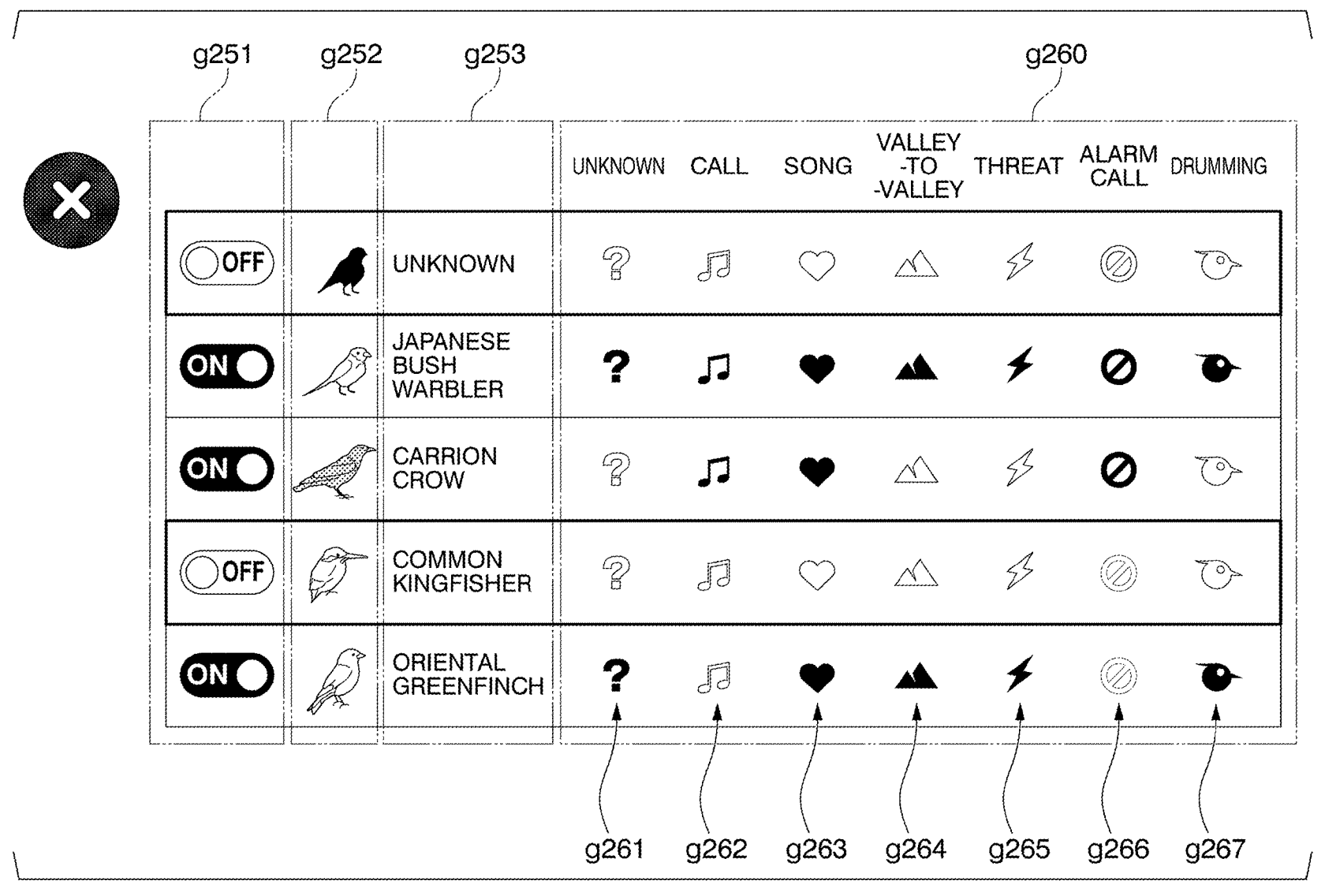

| | | | UNKNOWN | CALL | SONG | VALLEY -TO -VALLEY | THREAT | ALARM CALL | DRUMMING |
|---|---|---|---|---|---|---|---|---|---|
| OFF | 🐦 | UNKNOWN | ? | ♫ | ♡ | △ | ⚡ | ⊘ | ◉ |
| ON | 🐦 | JAPANESE BUSH WARBLER | ? | ♫ | ♥ | ▲ | ⚡ | ⊘ | ● |
| ON | 🐦 | CARRION CROW | ? | ♫ | ♥ | △ | ⚡ | ⊘ | ◉ |
| OFF | 🐦 | COMMON KINGFISHER | ? | ♫ | ♡ | △ | ⚡ | ⊘ | ◉ |
| ON | 🐦 | ORIENTAL GREENFINCH | ? | ♫ | ♥ | ▲ | ⚡ | ⊘ | ● | g251, g252, g253, g260, g261, g262, g263, g264, g265, g266, g267

ACOUSTIC SCENE RECONSTRUCTION DEVICE, ACOUSTIC SCENE RECONSTRUCTION METHOD, AND PROGRAM

CROSS-REFERENCE TO RELATED APPLICATION

Priority is claimed on Japanese Patent Application No. 2018-157166, filed on Aug. 24, 2018, the contents of which are incorporated herein by reference.

BACKGROUND

Field of the Invention

The present invention relates to an acoustic scene reconstruction device, an acoustic scene reconstruction method, and a program.

Background

In recent years, devices that provide augmented reality (AR) experiences or virtual reality (VR) experiences to users using goggles or the like have been developed. In AR, information generated by computers overlaps visual spaces viewed in reality and is displayed on, for example, display units of goggles. In VR, virtual worlds depicted by computers are displayed on display units of goggles.

Japanese Unexamined Patent Application, First Publication No. 2013-008031 discloses a technology for displaying content spoken by a speaker in a direction in which the speech radiates from the position of a sound source. According to the technology disclosed in Japanese Unexamined Patent Application, First Publication No. 2013-008031, a viewer can easily check a speech situation.

In bird watching or the like, cries of birds are required to be separated and presented. When cries of wild birds are collected using microphone arrays (hereinafter referred to as mic arrays) in outdoor areas such as forests and the cries of the wild birds are separated from the collected sound signals, other sounds with sound sources close to the cries of the target birds desired to be recognized, such as sounds generated by cries of other birds or wind, may be mixed in separation sounds in some cases. On the other hand, Japanese Unexamined Patent Application, First Publication No. 2018-040848 discloses a scheme of performing sound source localization, sound source separation, and sound source identification with high precision even when sound sources are close to each other.

Scene analysis of bird cries is an important research subject in ecology. Researchers in this fields listen to and manually record information regarding bird cries such as "when and where" and "which kinds of birds." In this way, in scene analysis of bird cries, experience is necessary in order to know where wild birds are crying from and which kinds of wild birds are crying. This work is difficult and there is a possibility of defects such as recording results including bad reproduction or unavoidable human errors occurring. Therefore, results of the scene analysis of the bird cries are required to be automatically visualized so that extracted information of missing bird cries can be understood. For example, places where wild birds are crying from and the kinds of wild birds are required to be visualized in real time. In addition, for example, systems in which bird watching can be experienced with VR are required.

SUMMARY

However, in the technologies of the related art, systems capable of analyzing and supplying a scene where birds are crying have not been realized. In this way, in the technologies of the related art, systems capable of analyzing a sound and reconstructing scenes of the sound for supply have not been realized.

An aspect of the present invention provides an acoustic scene reconstruction device, an acoustic scene reconstruction method, and a program capable of analyzing a sound and reconstructing and presenting a scene of the sound.

(1) An acoustic scene reconstruction device according to an aspect of the present invention includes: a sound source localization and separation unit configured to perform sound source localization and sound source separation from a collected sound signal; an identification unit configured to identify a kind of a sound source contained in the sound signal; an analysis processing unit configured to estimate a position of the sound source based on a result obtained through the sound source localization and the sound source separation performed by the sound source localization and separation unit and a result obtained through the identification by the identification unit, select a separation sound based on a result obtained by estimating the position of the sound source, and generate visualization information by associating the result obtained by estimating the position of the sound source with a kind of a sound signal in accordance with the sound source; and a visualization processing unit configured to generate an image in which an image corresponding to the sound source is displayed at the estimated position of the sound source by using the visualization information and the separation sound and generate a sound in which the separation sound is reproduced at the estimated position of the sound source.

(2) In the acoustic scene reconstruction device, the sound source localization and separation unit may perform the sound source localization on a sound source direction of the sound source, perform the sound source separation to separate the separation sound, assign identification information of the sound source to each sound source localized based on a result of the sound source localization, output sound source identification information to which the identification information is assigned for each localized sound source, information regarding the sound source direction, and the separation sound subjected to the sound source separation to the analysis processing unit, extract an acoustic feature amount from the separation sound, and output the acoustic feature amount to which the identification information of the sound source is assigned for each localized sound source to the identification unit. The identification unit may acquire the sound source identification information, information regarding the sound source direction, and the separation sound subjected to the sound source separation for each localized sound source output by the sound source localization and separation unit, identify the kind of the sound source contained in the sound signal for each acquired sound source, and output the sound source identification information and an identification result which is an identified result to the analysis processing unit for each localized sound source.

(3) In the acoustic scene reconstruction device, the collection of the sound signal may be performed by a mic array including M (where M is an integer equal to or greater than 2) microphones, and the number of mic arrays may be N (where N is an integer equal to or greater than 2). The sound source localization and separation unit may be provided for each of the mic arrays, sound signals of M channels collected by an L (where L is an integer from 1 to N)-th mic array may be input to an L-th sound source localization and separation unit. The identification unit may be provided for each sound source localization and separation unit, an L-th sound source localization and separation unit may be connected to an L-th identification unit. The analysis processing unit may acquire sound source identification information to which identification information is assigned for each of the localized sound sources output by the first to N-th sound source localization and separation units, information regarding a sound source direction, and the separation sound subjected to the sound source separation, estimate the position of the sound source corresponding to the separation sound for each acquired separation sound based on the separation sounds of the plurality of microphones, and select the separation sound by the mic array closest in distance to the separation sound among the plurality of separation sounds when the plurality of sound source localization and separation units simultaneously detect the separation sound.

(4) In the acoustic scene reconstruction device, the sound signal may be a bird cry of a bird. The kind of the sound source contained in the sound signal may be a name of the bird and a cry way of the bird.

(5) The acoustic scene reconstruction device may include a controller configured to set the image and the sound generated by the visualization processing unit. At least one of an operation of switching between display and non-display of the kind of the sound source contained in the sound signal and an operation of switching display magnification of the kind of the sound source contained in the sound signal may be performed by operating the controller, and an operated operation result may be output to the visualization processing unit.

(6) An acoustic scene reconstruction method according to another aspect of the present invention includes: a sound source localization and separation step in which a sound source localization and separation unit performs sound source localization and sound source separation from a collected sound signal; an identification step in which an identification unit identifies a kind of a sound source contained in the sound signal; a step in which an analysis processing unit estimates a position of the sound source based on a result obtained through the sound source localization and the sound source separation performed by the sound source localization and separation step and a result obtained through the identification by the identification step, selects a separation sound based on a result obtained by estimating the position of the sound source, and generates visualization information by associating the result obtained by estimating the position of the sound source with a kind of a sound signal in accordance with the sound source; and a step in which a visualization processing unit generates an image in which an image corresponding to the sound source is displayed at the estimated position of the sound source by using the visualization information and the separation sound and generates a sound in which the separation sound is reproduced at the estimated position of the sound source.

(7) Still another aspect of the present invention is a computer-readable non-transitory recording medium that includes a program causing a computer of an acoustic scene reconstruction device to execute: a sound source localization and separation step of performing sound source localization and sound source separation from a collected sound signal; an identification step of identifying a kind of a sound source contained in the sound signal; a step of estimating a position of the sound source based on a result obtained through the sound source localization and the sound source separation performed by the sound source localization and separation step and a result obtained through the identification by the identification step, selecting a separation sound based on a result obtained by estimating the position of the sound source, and generating visualization information by associating the result obtained by estimating the position of the sound source with a kind of a sound signal in accordance with the sound source; and a step of generating an image in which an image corresponding to the sound source is displayed at the estimated position of the sound source by using the visualization information and the separation sound and generating a sound in which the separation sound is reproduced at the estimated position of the sound source.

According to the above-described (1), (6), or (7), it is possible to analyze a sound and reconstruct and present a scene of the sound.

According to the above-described (2), since information necessary in each functional unit is output, it is possible to reduce a processing amount and perform a process with high precision.

According to the above-described (3), a sound signal which is clear and has little noise can be used for a separation signal so that a separation sound in which a distance between a mic array and a sound source is close can be selected among separation sounds collected and separated with a plurality of mic arrays.

According to the above-described (4), it is possible to visualize and display the kind of the bird or the cry way. In addition, according to the above-described (4), a user can experience previously recorded data once more by performing VR reproduction.

According to the above-described (5), a user or an operator can simply operate a VR image to be displayed.

BRIEF DESCRIPTION OF THE DRAWINGS

FIG. 18 is a diagram illustrating a data configuration example output by the mic array according to the first embodiment.

FIG. 19 is a diagram illustrating an event data configuration example output by a sound source localization and separation unit according to the first embodiment.

FIG. 20 is a diagram illustrating a data example of a kind of bird according to the first embodiment.

FIG. 23 is a diagram illustrating identification result examples of cry ways of birds, kinds of birds, and noise by the bird species identification unit according to the first embodiment.

FIG. 25 is a diagram illustrating an image example of a list of wild birds according to the embodiment.

DESCRIPTION OF EMBODIMENTS

Figure 1:
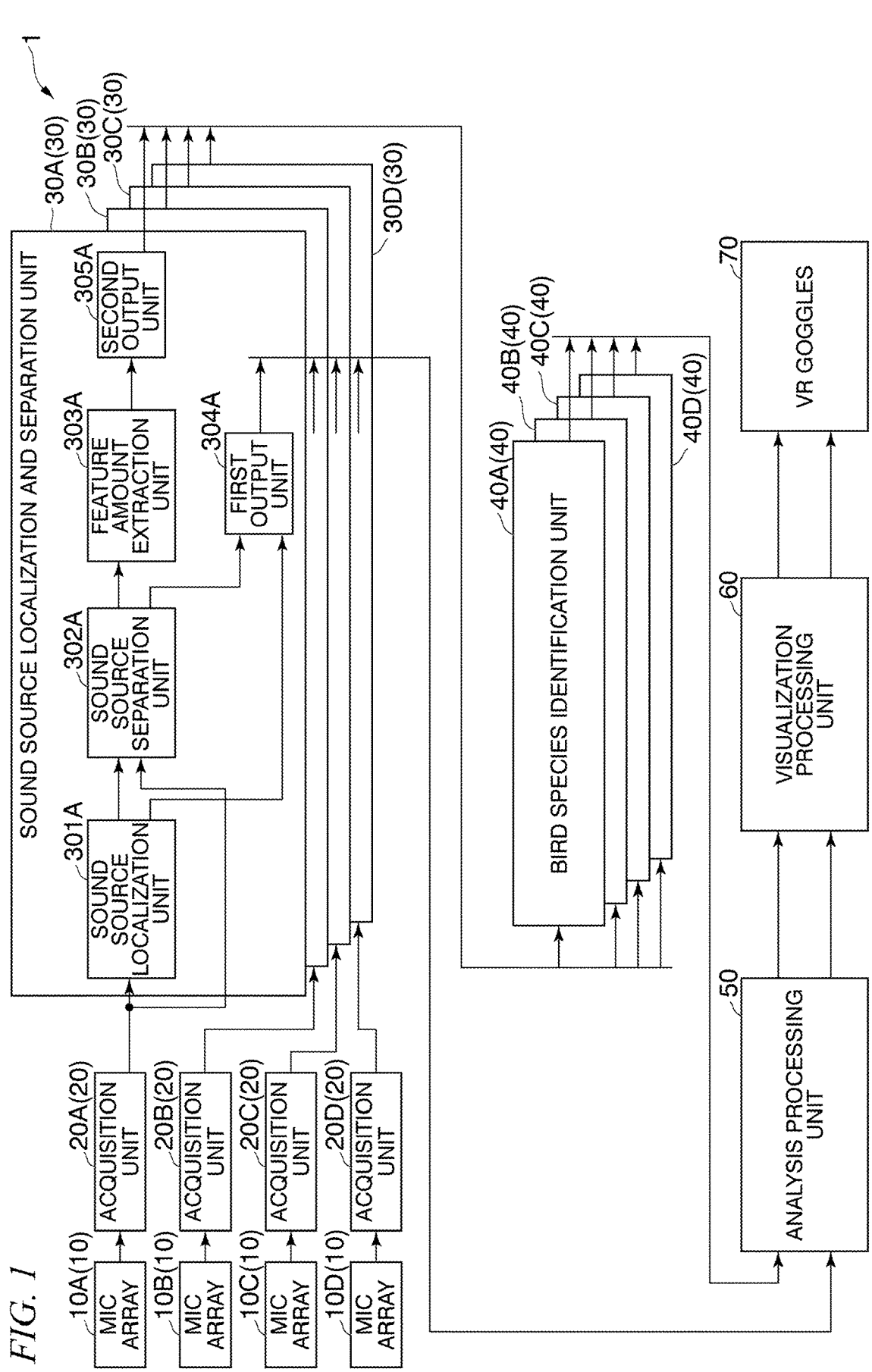
FIG. 1 is a block diagram illustrating a configuration example of an acoustic scene reconstruction device according to a first embodiment.

Hereinafter, embodiments of the present invention will be described with reference to the drawings. In the drawings used for the following description, the scales of members are appropriately changed so that each member has a recognizable size.

First Embodiment

[Configuration of Acoustic Scene Reconstruction Device 1]

FIG. 1 is a block diagram illustrating a configuration example of an acoustic scene reconstruction device 1 according to a first embodiment.

As illustrated in FIG. 1, the acoustic scene reconstruction device 1 includes mic arrays 10 (10A, 10B, 10C, and 10D), acquisition units 20 (20A, 20B, 20C, and 20D), sound source localization and separation units 30 (30A, 30B, 30C, and 30D), bird species identification units 40 (40A, 40B, 40C, and 40D), an analysis processing unit 50, a visualization processing unit 60, and VR goggles 70.

In the following description, when any one is not specified among the mic arrays 10A, 10B, 10C, and 10D, the mic arrays 10A, 10B, 10C, and 10D are referred to as the mic array 10. When any one is not specified among the acquisition units 20A, 20B, 20C, and 20D, the acquisition units 20A, 20B, 20C, and 20D are referred to as the acquisition unit 20. When any one is not specified among the sound source localization and separation units 30A, 30B, 30C, and 30D, the sound source localization and separation units 30A, 30B, 30C, and 30D are referred to as the sound source localization and separation unit 30. When any one is not specified among the bird species identification units 40A, 40B, 40C, and 40D, the bird species identification units 40A, 40B, 40C, and 40D are referred to as the bird species identification unit 40.

A configuration of the sound source localization and separation unit 30 will be described below. A configuration of the mic array 10 will be described below with reference to FIG. 2. A configuration of the bird species identification unit 40 will be described below with reference to FIG. 3. A configuration of the analysis processing unit 50 will be described below with reference to FIG. 4. A configuration of the visualization processing unit 60 will be described below with reference to FIG. 5.

The example illustrated in FIG. 1 is an example in which four mic arrays 10 are used, but the number of mic arrays 10 may be 1 or more. The acoustic scene reconstruction device 1 includes the number of acquisition units 20, the number of sound source localization and separation units 30, and the number of bird species identification units 40 corresponding to the number of mic arrays 10. For example, when the number of mic arrays 10 is 2, the number of acquisition units 20, the number of sound source localization and separation units 30, and the number of bird species identification units 40 are each 2.

The mic array 10 includes M (where M is an integer equal to or greater than 2) microphones or the like, as will be described below. The mic array 10 converts sound signals collected by the M microphones into digital signals, assigns a mic array number to the sound signals converted into the digital signals, and outputs the sound signals to the acquisition unit 20. The mic array 10A outputs the sound signals to the acquisition unit 20A, the mic array 10B outputs the sound signals to the acquisition unit 20B, the mic array 10C outputs the sound signals to the acquisition unit 20C, and the mic array 10D outputs the sound signals to the acquisition unit 20D. The mic array 10 may transmit the collected sound signals of M channels to the acquisition unit 20 wirelessly or may transmit the sound signals through wires. The sound signals may be synchronized between the channels at the time of transmission. The mic array number includes identification information of the mic array 10 and a position at which the mic array 10 is installed (coordinates in the xyz space to be described below with reference to FIG. 7 and the like).

The acquisition unit 20 acquires the M sound signals which are collected by the M microphones of the mic array 10 and to which the mic array number is assigned. The acquisition unit 20 generates an input signal of a frequency domain by performing a Fourier transform on the acquired M sound signals for each frame in a time domain. The acquisition unit 20 assigns a mic array number to the M sound signals subjected to the Fourier transform and outputs the sound signals to the sound source localization and separation unit 30. The acquisition unit 20A outputs the sound signals to the sound source localization and separation unit 30A, the acquisition unit 20B outputs the sound signals to the sound source localization and separation unit 30B, the acquisition unit 20C outputs the sound signals to the sound source localization and separation unit 30C, and the acquisition unit 20D outputs the sound signals to the sound source localization and separation unit 30D. The acquisition unit 20 and the sound source localization and separation unit 30 are connected in a wireless or wired manner.

The sound source localization and separation unit 30 performs estimation of azimuth angles of the sound sources (sound source localization), separation of the sound signals separated in each azimuth direction (sound source separation), and extraction of a feature amount of the separated sound signals based on the M sound signals to which the mic array number is assigned and which are input from the acquisition unit 20. The sound source localization and separation unit 30 assigns identification information (ID) to each of the separated sound sources and outputs the sound source ID to which the ID is assigned (sound source identification information) and the feature amount to the bird species identification unit 40. The sound source localization and separation unit 30 outputs the sound source ID to which the ID is assigned, an azimuth angle and elevation angle of the sound source, the separated separation sound, and the mic array number to the analysis processing unit 50 for each source in which the sound source can be localized. The sound source localization and separation unit 30 outputs the sound source ID, the azimuth angle and elevation angle of the sound source, the separated separation sound, and the mic array number to the analysis processing unit 50 for each sound source that can be localized. Therefore, the sound source localization and separation unit 30 outputs the sound source IDs, the azimuth angles and elevation angles of the sound sources, the separation sounds, and the mic array numbers of the plurality of sound sources to the analysis processing unit 50 in some cases. A configuration and a process performed by each unit of the sound source localization and separation unit 30 will be described later. The sound source localization and separation unit 30, the bird species identification unit 40, and the analysis processing unit 50 are connected in a wired or wireless manner. North is set to 0 degrees and an angle in the horizontal direction with respect to north is referred to as an azimuth angle. The horizontal surface of the ground is set to 0 degrees and an angle in the vertical direction with respect to the horizontal surface is referred to as an elevation angle. The sound source localization and separation unit 30 may be configured in conformity with HARK (Honda Research Institute Japan Audition for Robots with Kyoto University) (K. Nakadai, H. G Okuno, and T. Mizumoto, "Development, deployment and applications of robot audition open source software HARK," Journal of Robotics and Mechatronics, vol. 29, no. 1, pp. 16 to 25, 2017).

The bird species identification unit 40 (an identification unit) acquires a feature amount and the sound source ID output by the sound source localization and separation unit 30 and identifies a kind of bird (bird species) and a cry way of the bird based on the acquired feature amount. The cry way may be a call, a song, valley-to-valley, an alarm call, drumming, or the like.

The bird species identification unit 40 outputs the sound source ID, the kind of bird, and the cry way to the analysis processing unit 50. A configuration and a process performed by each unit of the bird species identification unit 40 (see FIG. 2) will be described later. The bird species identification unit 40 and the analysis processing unit 50 are connected in a wireless or wired manner.

The analysis processing unit 50 acquires the sound source ID, the azimuth angle and elevation angle of the sound source, the separation sound, the mic array number output by each of the sound source localization and separation units 30 and the sound source ID, the kind of bird, and the cry way output by each of the bird species identification units 40. The kind of bird may be the name of a bird or may be an identification number corresponding to the name of the bird. The analysis processing unit 50 generates visualization information and separation sound information using the acquired information and outputs the generated visualization information and the separation sound information to the visualization processing unit 60. A configuration and a process performed by each unit of the analysis processing unit 50 (see FIG. 3) will be described later. The analysis processing unit 50 and the visualization processing unit 60 are connected in a wireless or wired manner.

The visualization processing unit 60 acquires the visualization information and the separation sound information output by the analysis processing unit 50.

The visualization processing unit 60 generates a 3-dimensional (3D) VR image and 3D VR sound based on the acquired visualization information and separation sound information and outputs the generated 3D VR image and 3D VR sound to the VR goggles 70. A configuration and a process performed by each unit of the visualization processing unit 60 (see FIG. 3) will be described later. The visualization processing unit 60 and the VR goggles 70 are connected in a wireless or wired manner.

The VR goggles 70 display the 3D VR image output by the visualization processing unit 60 and reproduce the 3D VR sound output by the visualization processing unit 60. A configuration of the VR goggles 70 (see FIG. 6) will be described later.

[Configuration of Mic Array 10]

Next, a configuration example of the mic array 10 will be described.

Figure 2:
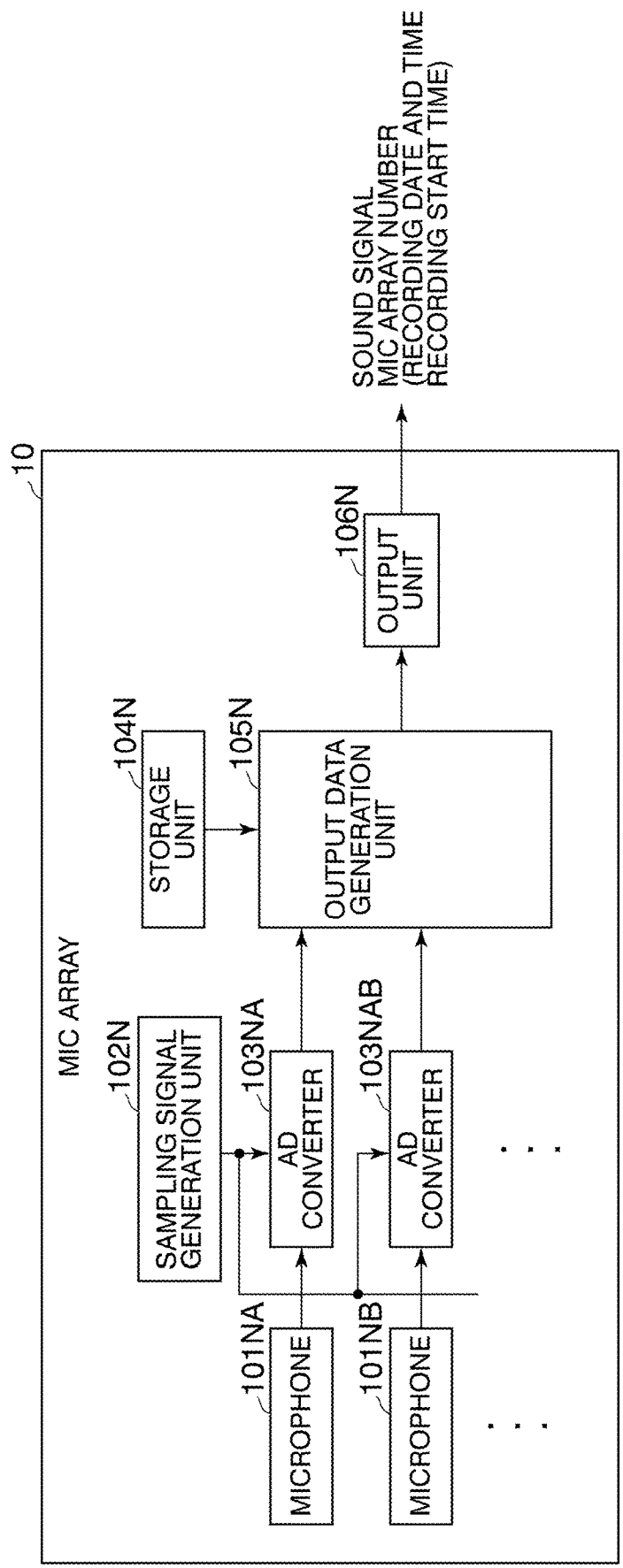
FIG. 2 is a diagram illustrating a configuration example of a mic array according to the first embodiment.

FIG. 2 is a diagram illustrating a configuration example of the mic array 10 according to the embodiment. As illustrated in FIG. 2, each mic array 10 includes M (where M is an integer equal to or greater than 2 and is, for example, 8) microphones 101NA (where N is an integer equal to or greater than 2), 101NB, . . . , 101NM, a sampling signal generation unit 102N, an AD converter 103NA, 103NB, . . . , and 103NM, a storage unit 104N, an output data generation unit 105N, and an output unit 106N.

The microphones 101NA, 101NB, . . . , and 101NM are disposed at different positions. The microphone S101N is connected to the analog-digital (AD) converter 103N. The microphone 101NA is connected to the AD converter 103NA.

The microphone 101NB is connected to the analog-digital (AD) converter 103NB. The microphone 101NM is connected to the AD converter 103NM. For example, when the shape of the mic array 10 is spherical, the microphones are disposed in the horizontal and vertical directions. The sound source localization and separation units 30 can detect azimuth angles in the horizontal direction and elevation angles in the vertical direction using the sound signals collected by the plurality of microphones disposed in this way.

The sampling signal generation unit 102N generates sampling signals which are used by the AD converters 103NA, 103NB, . . . , and 103NM and outputs the generated sampling signals to the AD converters 103NA, 103NB, . . . , and 103NM. A frequency of the sampling signal is, for example, 16 kHz.

The AD converters 103NA, 103NB, . . . , and 103NM convert analog signals collected by the corresponding microphones 101NA, 101NB, . . . , and 101NM, respectively, into digital signals and outputs the sound signals to the output data generation unit 105N.

The storage unit 104N stores the mic array number.

The output data generation unit 105N generates sound signals of M channels using the M sound signals output by the AD converters 103NA, 103NB, . . . , and 103NM. The output data generation unit 105N assigns a mic array number to the generated sound signals of the M channels and outputs the sound signals to the output unit 106N.

The output unit 106N outputs the sound signals of the M channels to which the mic array number output by the output data generation unit 105N is assigned, to the acquisition unit 20N. A format of the digital signal output by the mic array 10 will be described later. The data output by the output unit 106N may include information such as a recording date and time and a recording start time, as will be described later.

Each of the plurality of mic arrays 10 acquires a sound signal containing bird cries asynchronously at the same time. Each of the mic arrays 10 may include a recording unit and output recorded data to the acquisition unit 20.

[Configuration and Process of Each Unit of Sound Source Localization and Separation Unit 30]

Next, a configuration and a process of each unit of the sound source localization and separation unit 30 will be described.

The sound source localization and separation unit 30N (where N is A to D) includes a sound source localization unit 301N, a sound source separation unit 302N, a feature amount extraction unit 303N, a first output unit 304N, and a second output unit 305N.

The sound source localization unit 301N (where N is A to D) decides a direction of each sound source for each frame of a pre-decided length (for example, 20 ms) based on the sound signals of the M channels to which the mic array number output by the acquisition unit 20 is assigned (sound source localization). The sound source localization unit 301N calculates a spatial spectrum indicating power in each direction using, for example, a multiple signal classification (MUSIC) method in the sound source localization. The sound source localization unit 301N decides a sound source direction for each sound source based on the spatial spectrum. The sound source localization unit 301N assigns a sound source ID to sound source direction information (an azimuth angle and elevation angle of a sound source) indicating a sound source direction and outputs the sound source direction information to the sound source separation unit 302N. The sound source localization unit 301N assigns a sound source ID and a mic array number to sound source direction information (an azimuth angle and elevation angle of a sound source) indicating a sound source direction and outputs the sound source direction information and the mic array number to the first output unit 304N.

The sound source localization unit 301N may calculate sound source localization using another scheme, for example, a weighted delay and sum beam forming (WDS-BF) method, instead of the MUSIC method.

The sound source separation unit 302N (where N is A to D) acquires the sound source direction information to which the sound source ID output by the sound source localization unit 301N is assigned and the sound signals of the M channels output by the acquisition unit 20. The sound source separation unit 302N separates the sound signals of the M channels into sound signals (separation signals) by sound sources which are sound signals indicating components for each sound source based on the sound source direction indicated by the sound direction information. The sound source separation unit 302N uses, for example, a geometric-constrained high-order decorrelation-based source separation (GHDSS) method at the time of separation into sound signals by the sound sources. The sound source separation unit 302N obtains a spectrum of the separated sound signals and outputs the obtained spectrum of the sound signals to the feature amount extraction unit 303N. The sound source separation unit 302N outputs all the separated separation sounds to the first output unit 304N.

The sound source localization and separation unit 30 may include a speech section detection unit (not illustrated). When the sound source localization and separation unit 30 includes the speech section detection unit, the speech section detection unit may detect a speech section (a start time of speech and an end time of the speech) based on the sound source direction information output by the sound source localization unit 301N and the sound signals of the M channels output by the acquisition unit 20. The sound source separation unit 302N may separate the sound sources using a speech section (a start time of speech and an end time of the speech) detected by the speech section detection unit. The sound source separation unit 302N may consider a section in which the magnitude of the sound signal is equal to or greater than a predetermined value as a speech section.

The feature amount extraction unit 303N (where N is A to D) calculates an acoustic feature amount from the spectrum output by the sound source separation unit 302N for each sound source. The feature amount extraction unit 303N calculates an acoustic feature amount by calculating, for example, a static Mel-scale log spectrum (MSLS), a delta MSLS, and one delta power for each predetermined time (for example, 10 ms). The MSLS is obtained by performing an inverse discrete cosine transformation on a Mel frequency cepstrum coefficient (MFCC) using the spectrum feature amount which is the feature amount of acoustic recognition. The feature amount extraction unit 303N outputs the obtained acoustic feature amount to the second output unit 305N.

The first output unit 304N (where N is A to D) outputs the sound source ID output by the sound source localization unit 301N, the separation sound, and the azimuth angle and elevation angle of the sound source to which the mic array number is assigned, to the analysis processing unit 50. The data output by the first output unit 304N includes data for each of the plurality of sound sources in some cases.

The second output unit 305N (where N is A to D) outputs an acoustic feature amount to which the sound source ID output by the feature amount extraction unit 303N is assigned, to the bird species identification unit 40. The sound source localization and separation unit 30A outputs the acoustic feature amount to the bird species identification unit 40A, the sound source localization and separation unit 30B outputs the acoustic feature amount to the bird species identification unit 40B, the sound source localization and separation unit 30C outputs the acoustic feature amount to the bird species identification unit 40C, and the sound source localization and separation unit 30D outputs the acoustic feature amount to the bird species identification unit 40D. The data output by the second output unit 305N includes data for each of the plurality of sound sources in some cases.

[Configuration and Process of Each Unit of Bird Species Identification Unit 40]

Next, a configuration and a process of each unit of the bird species identification unit 40 will be described.

Figure 3:
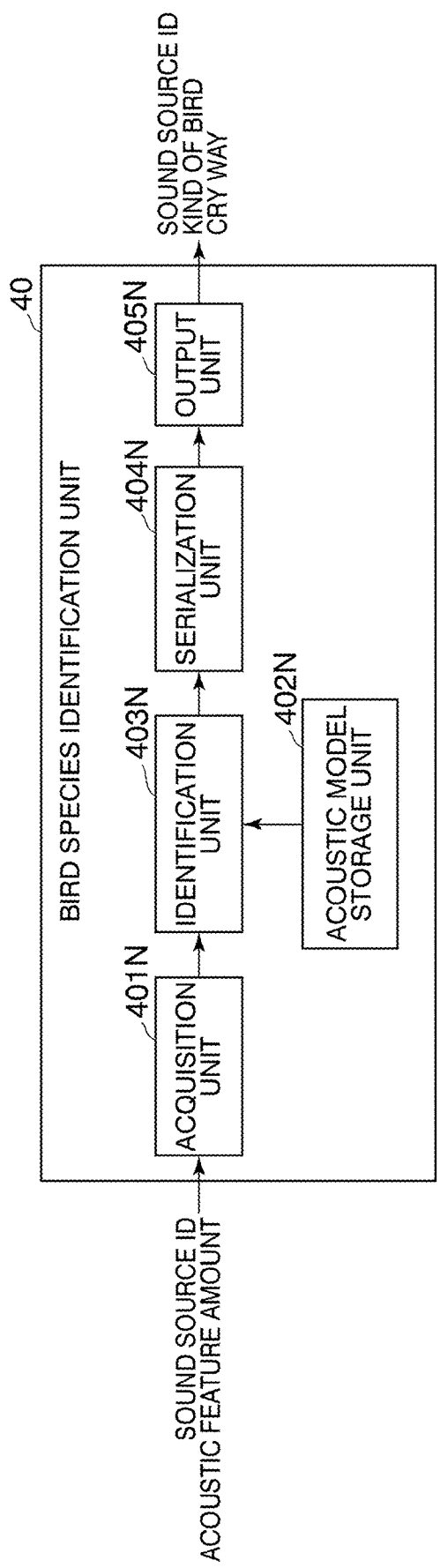
FIG. 3 is a block diagram illustrating a configuration example of a bird species identification unit according to the first embodiment.

FIG. 3 is a block diagram illustrating a configuration example of the bird species identification unit 40 according to the embodiment. As illustrated in FIG. 3, the bird species identification unit 40 includes an acquisition unit 401N, an acoustic model storage unit 402N, an identification unit 403N, a serialization unit 404N, and an output unit 405N.

The acquisition unit 401N acquires an acoustic feature amount to which the sound source ID output by the sound source localization and separation unit 30 is assigned and outputs the acquired acoustic feature amount to which the sound source ID is assigned, to the identification unit 403N.

For each kind of bird (bird name), the acoustic model storage unit 402N associates and stores feature amounts of cries of birds for each cry way by kinds of birds. For example, when the kind of bird is Japanese bush warbler, the acoustic model storage unit 402N associate and stores a feature amount of a call of the Japanese bush warbler, a feature amount of a song of the Japanese bush warbler, a feature amount of a threat of the Japanese bush warbler, a feature amount of valley-to-valley of the Japanese bush warbler, and a feature amount of an alarm call of the Japanese bush warbler for the kind Japanese bush warbler.

The identification unit 403N identifies a kind of bird and a cry way with reference to the acoustic model storage unit 402N with regard to the acoustic feature amount to which the sound source ID output by the acquisition unit 401N is assigned. The identification unit 403N outputs the identified sound source ID, the kind of bird, and the cry way to the serialization unit 404N. The identification unit 403 identifies the sound source with high precision by effectively using information regarding close sound sources using, for example, the technology disclosed in Japanese Unexamined Patent Application, First Publication No. 2018-040848. The identification unit 403N performs classification into of bird cries closest to separation sounds based on, for example, a convolution neural network (CNN). The identification unit 403N performs identification for each of the sound sources (separation sounds) which can be localized by the sound source localization and separation unit 30. The identification unit 403N may perform the classification of the cries using a deep neural network (DNN) or the like. The identification unit 403N may identify the kinds of birds and the cries using an identification scheme in the field of general machine learning such as GMM or SVM.

The serialization unit 404N performs conversion (hereinafter referred to as serialization) into a byte arrangement in which the sound source IDs, the kinds of birds, and the cries output by the identification unit 403N can be read and written in units of bytes and outputs converted data (the sound source IDs, the kinds of birds, and the cries) to the output unit 405N. The converted data includes data (the sound source IDs, the kinds of birds, and the cries) identified for each of the sounds (separation sounds) which can be localized by the sound source localization and separation unit 30.

The output unit 405N outputs the sound source IDs, the kinds of birds, and the cries serialized by the serialization unit 404N to the analysis processing unit 50. A format of the information output by the output unit 405N will be described later.

[Configuration and Process of Each Unit of Analysis Processing Unit 50]

Next, a configuration and a process of each unit of the analysis processing unit 50 will be described.

Figure 4:
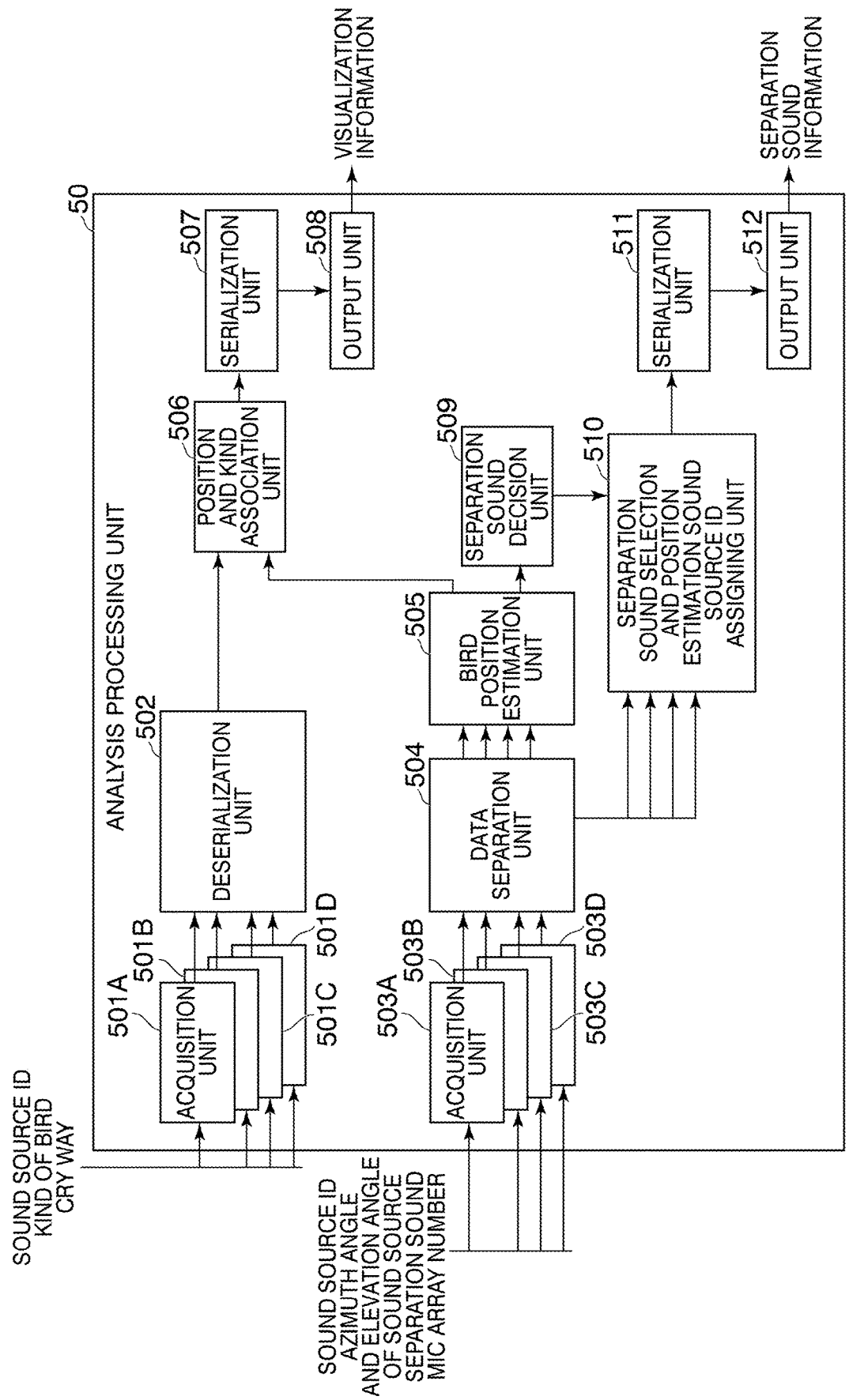
FIG. 4 is a block diagram illustrating a configuration example of an analysis processing unit according to the first embodiment.

FIG. 4 is a block diagram illustrating a configuration example of the analysis processing unit 50 according to the embodiment. As illustrated in FIG. 4, the analysis processing unit 50 includes acquisition units 501A, 501B, 501C, and 501D, a deserialization unit 502, acquisition units 503A, 503B, 503C, and 503D, a data separation unit 504, a bird position estimation unit 505, a position and kind association unit 506, a serialization unit 507, an output unit 508, a separation sound decision unit 509, a separation sound selection and position estimation sound source ID assigning unit 510, a serialization unit 511, and an output unit 512.

The acquisition unit 501A acquires the serialized sound source ID, the serialized kind of bird, and the serialized cry way output by the bird species identification unit 40A and outputs the acquired serialized sound source ID, kind of bird, and cry way to the deserialization unit 502.

The acquisition unit 501B acquires the serialized sound source ID, the serialized kind of bird, and the serialized cry way output by the bird species identification unit 40B and outputs the acquired serialized sound source ID, kind of bird, and cry way to the deserialization unit 502.

The acquisition unit 501C acquires the serialized sound source ID, the serialized kind of bird, and the serialized cry way output by the bird species identification unit 40C and outputs the acquired serialized sound source ID, kind of bird, and cry way to the deserialization unit 502.

The acquisition unit 501D acquires the serialized sound source ID, the serialized kind of bird, and the serialized cry way output by the bird species identification unit 40D and outputs the acquired serialized sound source ID, kind of bird, and cry way to the deserialization unit 502.

The serialized data acquired by the acquisition units 501A, 501B, 501C, and 501D includes the data (the sound source IDs, the kinds of birds, and the cry ways) identified by the bird species identification units 40A, 40B, 40C, and 40D for each of the sounds (separation sounds) which can be localized by the sound source localization and separation unit 30.

The deserialization unit 502 returns the serialized byte sequence to the original data with regard to the serialized sound source IDs, kinds of birds, and cries output by the acquisition units 501A, 501B, 501C, and 501D and integrates the data. The deserialization unit 502 outputs the sound source IDs, the kinds of birds, and the cries in which the data of the acquisition units 501A, 501B, 501C, and 501D is integrated to the position and kind association unit 506. The data output by the deserialization unit 502 includes the data (the sound source IDs, the kinds of birds, and the cries) identified by the bird species identification units 40A, 40B, 40C, and 40D for each of the sounds (separation sounds) which can be localized by the sound source localization and separation units 30A, 30B, 30C, and 30D.

The acquisition unit 503A acquires the separation sound and the azimuth angle and elevation angle of the sound source to which the sound source ID and the microphone number output by the sound source localization and separation unit 30A are assigned and outputs the acquired separation sound and the acquired azimuth angle and elevation angle of the sound source to which the sound source ID and the microphone number are assigned, to the data separation unit 504.

The acquisition unit 503B acquires the separation sound and the azimuth angle and elevation angle of the sound source to which the sound source ID and the microphone number output by the sound source localization and separation unit 30B are assigned and outputs the acquired separation sound and the acquired azimuth angle and elevation angle of the sound source to which the sound source ID and the microphone number are assigned, to the data separation unit 504.

The acquisition unit 503C acquires the separation sound and the azimuth angle and elevation angle of the sound source to which the sound source ID and the microphone number output by the sound source localization and separation unit 30C are assigned and outputs the acquired separation sound and the acquired azimuth angle and elevation angle of the sound source to which the sound source ID and the microphone number are assigned, to the data separation unit 504.

The acquisition unit 503D acquires the separation sound and the azimuth angle and elevation angle of the sound source to which the sound source ID and the microphone number output by the sound source localization and separation unit 30D are assigned and outputs the acquired separation sound and the acquired azimuth angle and elevation angle of the sound source to which the sound source ID and the microphone number are assigned, to the data separation unit 504.

The data (the separation sound and the azimuth angle and elevation angle of the sound source to which the microphone number is assigned) acquired by each of the acquisition units 503A, 503B, 503C, and 503D includes the data (the separation sound and the azimuth angle and elevation angle of the sound source to which the microphone number is assigned) for each sound (separation sound) of all the sounds which can be localized by the sound source localization and separation units 30.

The data separation unit 504 separates the separation sounds of the azimuth angles and elevation angles of the sound sources to which the sound source IDs and the microphone numbers output by each of the acquisition units 503A, 503B, 503C, and 503D are assigned into the azimuth angles and elevation angles of the sound sources to which the sound sources ID and the microphone numbers are assigned, and the separation sounds and the sound source IDs. The data separation unit 504 outputs the azimuth angles and elevation angles of the sound sources to which the sound sources ID and the microphone numbers are assigned, to the bird position estimation unit 505. The data (the azimuth angles and elevation angles of the sound sources to which the sound sources ID and the microphone numbers are assigned) output to the bird position estimation unit 505 by the data separation unit 504 is data (the azimuth angles and elevation angles of the sound sources to which the sound sources ID and the microphone numbers are assigned) for all the sounds (separation sounds) which can be localized by the sound source localization and separation units 30. The data separation unit 504 outputs the separation sounds and the sound source IDs to the separation sound selection and position estimation sound source ID assigning unit 510. The separation sounds output to the separation sound selection and position estimation sound source ID assigning unit 510 by the data separation unit 504 includes all the sounds (separation sounds) which can be localized by the sound source localization and separation units 30.

The bird position estimation unit 505 estimates the position of a bird of a cry for each sound source ID based on data of the azimuth angle and elevation angle of the sound sources to which the sound source ID and the microphone number output by the data separation unit 504 are assigned and sets the position of a bird of the estimated sound source ID as bird coordinates. The bird position estimation unit 505 assigns identification information to a separation sound from which bird coordinates are estimated and sets the identification information as a position estimation sound source ID. When the sound source is located and separated at the same time by the mic arrays 10A, 10B, and 10C, for example, the bird position estimation unit 505 assigns the position estimation sound source ID=6 with regard to a sound source ID=10 by the mic array 10A, the sound source ID=5 by the mic array 10B, and the sound source ID=12 by the mic array 10C. The bird position estimation unit 505 outputs the position estimation sound source ID and the estimated bird coordinates to the position and kind association unit 506. The bird position estimation unit 505 outputs the position estimation sound source ID, the sound source ID from which the bird coordinates are estimated, and the mic array number corresponding to the sound source ID to the separation sound decision unit 509. The bird position estimation unit 505 estimates the bird coordinates in accordance with a scheme of triangulation (for example, see Japanese Patent Application No. 2017-172452) using the plurality of mic arrays 10 collecting a plurality of separation sounds detected at the same time, as will be described below. The bird position estimation unit 505 estimates coordinates for each of all the sounds (separation sounds) localized by the sound source localization and separation unit 30.

The position and kind association unit 506 acquires the sound source IDs, the kinds of birds, and the cry ways output by the deserialization unit 502 and the position estimation sound source ID and the bird coordinates output by the bird position estimation unit 505. The position and kind association unit 506 associates the main bird coordinates, the kind of bird, and the cry way of the cry based on the sound source ID, the kind of bird, the cry way, the position estimation sound source ID, and the bird coordinates. The position and kind association unit 506 outputs the position estimation sound source ID, the bird coordinates, the kind of bird, and the cry way associated with each other to the serialization unit 507. The position and kind association unit 506 associates the bird coordinates and the data (the sound source ID, the kind of bird, and the cry way) identified by the bird species identification units 40A, 40B, 40C, and 40D for each of all the sounds (separation sounds) localized by the sound source localization and separation units 30A, 30B, 30C, and 30D. That is, in the embodiment, the sound source localization and separation units 30, the bird species identification units 40, and the analysis processing unit 50 extract and information regarding the position (the bird coordinates) and the cries of the birds related to kinds from the sound signals acquired by the mic array 10 and integrate the position and the information to a cry of the bird. When the sound source localization and separation unit 30 includes a speech section detection unit, the integrated cry event of the bird also includes time information (speech start time and speech end time). In this case, the time information (the speech start time and the speech end time) is included in the data output by the second output unit 305N of the sound source localization and separation unit 30.

The serialization unit 507 serializes the position estimation sound source ID, the bird coordinates, the kind of bird, and the cry way output by the position and kind association unit 506. The serialization unit 507 outputs the serialized position estimation sound source ID, bird coordinates, kind of bird, and cry way as visualization information to the output unit 508.

The data output by the serialization unit 507 is the data (the bird coordinates, the kind of bird, and the cry way) in which the bird coordinates are associated with the data (the sound source ID, the kind of bird, and the cry way) identified by the bird species identification units 40A, 40B, 40C, and 40D for each of all the sounds (separation sounds) localized by the sound source localization and separation units 30A, 30B, 30C, and 30D. The visualization information is, for example, a JavaScript (registered trademark) object notation (JSON) format. The visualization information may include two kinds of information, metadata (information regarding the mic array and information regarding sound collection) and event data (frame information and information for each bird) to be described below.

The output unit 508 outputs the visualization information output by the serialization unit 507 to the visualization processing unit 60.

The separation sound decision unit 509 decides a separation sound based on the position estimation sound source ID output by the bird position estimation unit 505 and outputs a decided decision result to the separation sound selection and position estimation sound source ID assigning unit 510. The information output to the separation sound selection and position estimation sound source ID assigning unit 510 by the separation sound decision unit 509 includes the mic array number, the sound source ID, the position estimation sound source ID. The separation sound decision unit 509 selects and decides the separation sound collected by the mic array 10 closest to the sound source based on the estimated position of the bird (the sound source position) and the position at which the mic array 10 is installed and which is included in the mic array number. For example, when the position estimation sound source ID=6 is assigned with regard to the sound source ID=10 by the mic array 10A, the sound source ID=5 by the mic array 10B, and the sound source ID=12 by the mic array 10C, the separation sound decision unit 509 selects the separation sound of the sound source ID=10 by the mic array 10A closest to the sound source. Even when a bird is singing and moving and the coordinates are changed, the separation sound decision unit 509 does not fix and follow mic array selection in order to prevent a change in sound quality due to switching. The decision of the separation sounds will be described later.

The separation sound selection and position estimation sound source ID assigning unit 510 assigns the position estimation sound source ID to the separation sound output by the data separation unit 504 in accordance with the decision result output by the separation sound decision unit 509. For example, when the sound source ID=10 by the mic array 10A is the decision result as the separation sound, the separation sound selection and position estimation sound source ID assigning unit 510 selects the separation sound corresponding to the sound source ID=10 and assigns the position estimation sound source ID=6 to the selected separation sound. The separation sound selection and position estimation sound source ID assigning unit 510 outputs the selected separation sound (a position estimation portion) and the position estimation sound source ID to the serialization unit 511. A method of assigning the position estimation sound source ID will be described later with reference to FIG. 10.

The serialization unit 511 serializes the position estimation sound source ID and the separation sound (a position estimation portion) output by the separation sound selection and position estimation sound source ID assigning unit 510. The serialization unit 511 outputs the serialized position estimation sound source ID and separation sound (the position estimation portion) as separation sound information to the output unit 512.

The output unit 512 outputs the separation sound information output by the serialization unit 511 to the visualization processing unit 60. The output unit 512 outputs the separation sound information for each separation sound.

[Configuration and Process of Each Unit of Visualization Processing Unit 60]

Next, a configuration and a process of each unit of the visualization processing unit 60 will be described.

Figure 5:
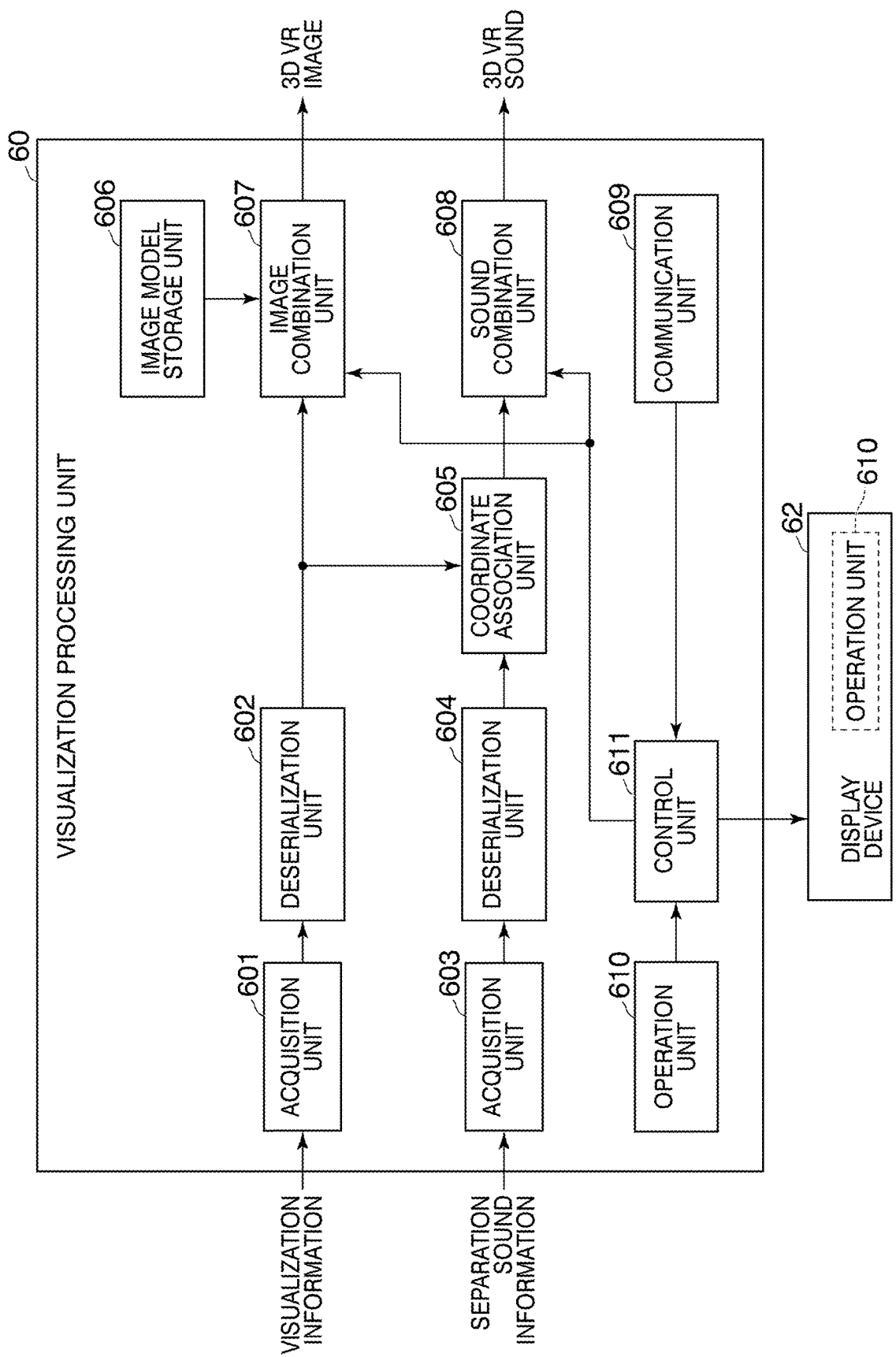
FIG. 5 is a diagram illustrating a configuration example of a visualization processing unit according to the first embodiment.

FIG. 5 is a diagram illustrating a configuration example of the visualization processing unit 60 according to the embodiment. As illustrated in FIG. 5, the visualization processing unit 60 includes an acquisition unit 601, a deserialization unit 602, an acquisition unit 603, a deserialization unit 604, a coordinate association unit 605, an image model storage unit 606, an image combination unit 607, a sound combination unit 608, a communication unit 609, an operation unit 610, and a control unit 611.

The acquisition unit 601 acquires the visualization information output by the analysis processing unit 50 and outputs the acquired visualization information to the deserialization unit 602.

The deserialization unit 602 returns the byte sequence serialized with regard to the serialized visualization information output by the acquisition unit 601 to the original data and outputs the visualization information returned to the original data to the coordinate association unit 605 and the image combination unit 607.

The acquisition unit 603 acquires the separation sound information output by the analysis processing unit 50 and outputs the acquired separation sound information to the deserialization unit 604.

The deserialization unit 604 returns the byte sequence serialized with regard to the serialized separation sound information output by the acquisition unit 603 to the original data and outputs the separation sound information returned to the original data to the coordinate association unit 605.

The coordinate association unit 605 acquires the visualization information output by the deserialization unit 602 and the separation sound information output by the deserialization unit 604. The coordinate association unit 605 extracts the bird coordinates included in the visualization information and associates the extracted bird coordinates and the separation sound with the position estimation sound source ID.

The coordinate association unit 605 outputs the separation sound and the position estimation sound source ID associated with the bird coordinates to the sound combination unit 608.

The image model storage unit 606 stores data of 3-dimensional (3D) image models of birds. With regard to one kind of bird, the image model storage unit 606 may store data of a plurality of image models such as data of an image model in which a bird is in a tree and data of an image model in which the bird is flying. The image model storage unit 606 stores image model data of a plant object in a VR space, image model data of an object such as a rock or a tree in the VR space, image model data for a topography in the VR space, and the like.

The image combination unit 607 generates a 3D image of a bird using the information stored in the image model storage unit 606 based on a kind of bird included in the visualization information output by the deserialization unit 602. The image combination unit 607 generates an image in the VR space using the data of the image models stored in the image model storage unit 606 based on user position information of the VR goggles 70 output by the control unit 611, combines the 3D image of the bird at the position of the bird coordinates included in the visualization information in the VR space, and outputs the combined image as a 3D VR image to the VR goggles 70. The 3D VR image includes an image indicating a direction of the bird and an image indicating the kind of bird (the name of the bird) in addition to the 3D VR image of the bird. The 3D VR image of the bird is an animation image.

Based on the user position information of the VR goggles 70 output by the control unit 611 and the separation sound and the position estimation sound source ID associated with the bird coordinates output by the coordinate association unit 605, the sound combination unit 608 generates sound information so that the separation sound is localized at the position of the bird coordinates in the VR space.

The sound combination unit 608 may store a wind sound, a stream sound, a leaves sound, or the like by wind and may combine such a sound with the separation sound. The sound combination unit 608 combines the cry of the bird so that a 3D audio sound can be reproduced from the position of the bird.

The communication unit 609 performs communication with the VR goggles 70 in a wired or wireless manner. The communication unit 609 receives the user position information output by the VR goggles 70 and a setting instruction and outputs the received user position information and setting instruction to the control unit 611.

The operation unit 610 detects an operation result operated by the user and outputs the detected operation result to the control unit 611. The operation result includes a setting instruction for a VR image.

The control unit 611 outputs the user position information output by the communication unit 609 to the image combination unit 607 and the sound combination unit 608. The control unit 611 generates an image for a setting screen and causes the display device 62 to display the generated image for the setting screen. The control unit 611 generates a display and setting instruction of an image to be displayed based on the setting instruction output by the communication unit 609 or the operation result output by the operation unit 610 and outputs the generated display instruction to the image combination unit 607. The display instruction includes expansion display and display or non-display of the kind of bird to be described below. The display device 62 may be a tablet terminal or the like. When the display device 62 is a tablet terminal, the display device 62 may include the operation unit 610. In this case, the operation unit 610 is a touch panel sensor provided on a display unit of the display device 62.

[Configuration and Process of Each Unit of VR Goggles 70]

Next, a configuration and a process of each unit of the VR goggles 70 will be described.

Figure 6:
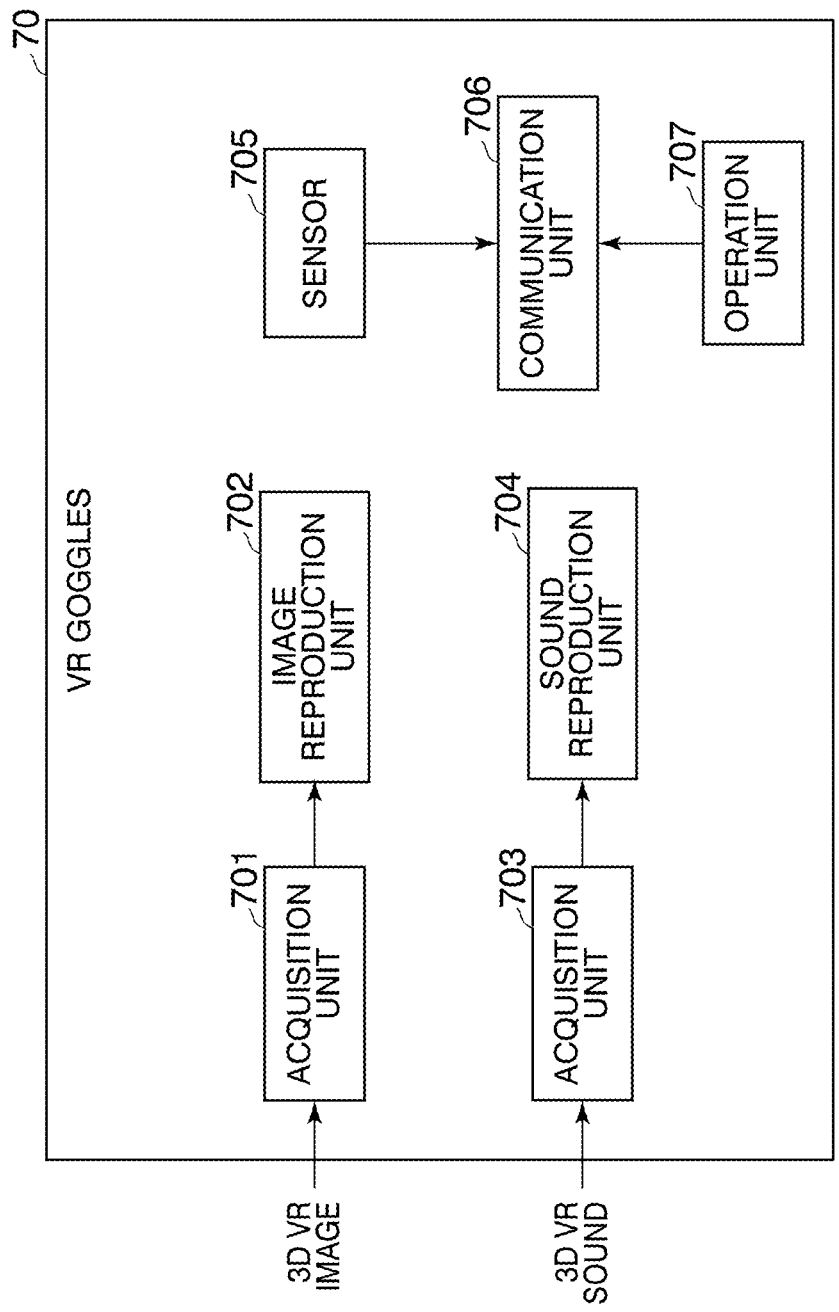
FIG. 6 is a diagram illustrating a configuration example of VR goggles according to the first embodiment.

FIG. 6 is a diagram illustrating a configuration example of the VR goggles 70 according to the embodiment. As illustrated in FIG. 6, the VR goggles 70 includes an acquisition unit 701, an image reproduction unit 702, an acquisition unit 703, a sound reproduction unit 704, a sensor 705, a communication unit 706, and an operation unit 707.

The acquisition unit 701 acquires a 3D VR image output by the visualization processing unit 60 and outputs the acquired 3D VR image to the image reproduction unit 702.

The image reproduction unit 702 includes right and left electro-luminescence (EL) display devices or liquid crystal display devices, a projection optical system, and an image display driving unit. The image reproduction unit 702 displays the 3D VR image output by the acquisition unit 701.

The acquisition unit 703 acquires the 3D VR sound output by the visualization processing unit 60 and outputs the acquired 3D VR sound to the sound reproduction unit 704.

The sound reproduction unit 704 includes right and left speakers and a sound driving unit. The sound reproduction unit 704 displays the 3D VR sound output by the acquisition unit 703.

The sensor 705 includes at least one of an acceleration sensor that detects acceleration, a gyro sensor that detects an angular velocity, an atmospheric sensor that detects an atmospheric pressure, and a Global Positioning System (GPS) receiver that detects positional information.

The sensor 705 outputs user position information (including a direction of the user) of the VR goggles 70 to the communication unit 706 based on a result detected by each sensor.

The communication unit 706 transmits the user position information output by the sensor 705 to the visualization processing unit 60. The communication unit 706 transmits an operation result output by the operation unit 707 to the visualization processing unit 60.

The operation unit 707 detects an operation result operated by the user and outputs the detected operation result to the communication unit 706. The operation result includes, for example, an instruction to set an image (display or non-display of a plant object or the like) displayed in the image reproduction unit 702.

[Arrangement Example of Mic Array]

Next, a disposition example of the mic arrays will be described.

Figure 7:
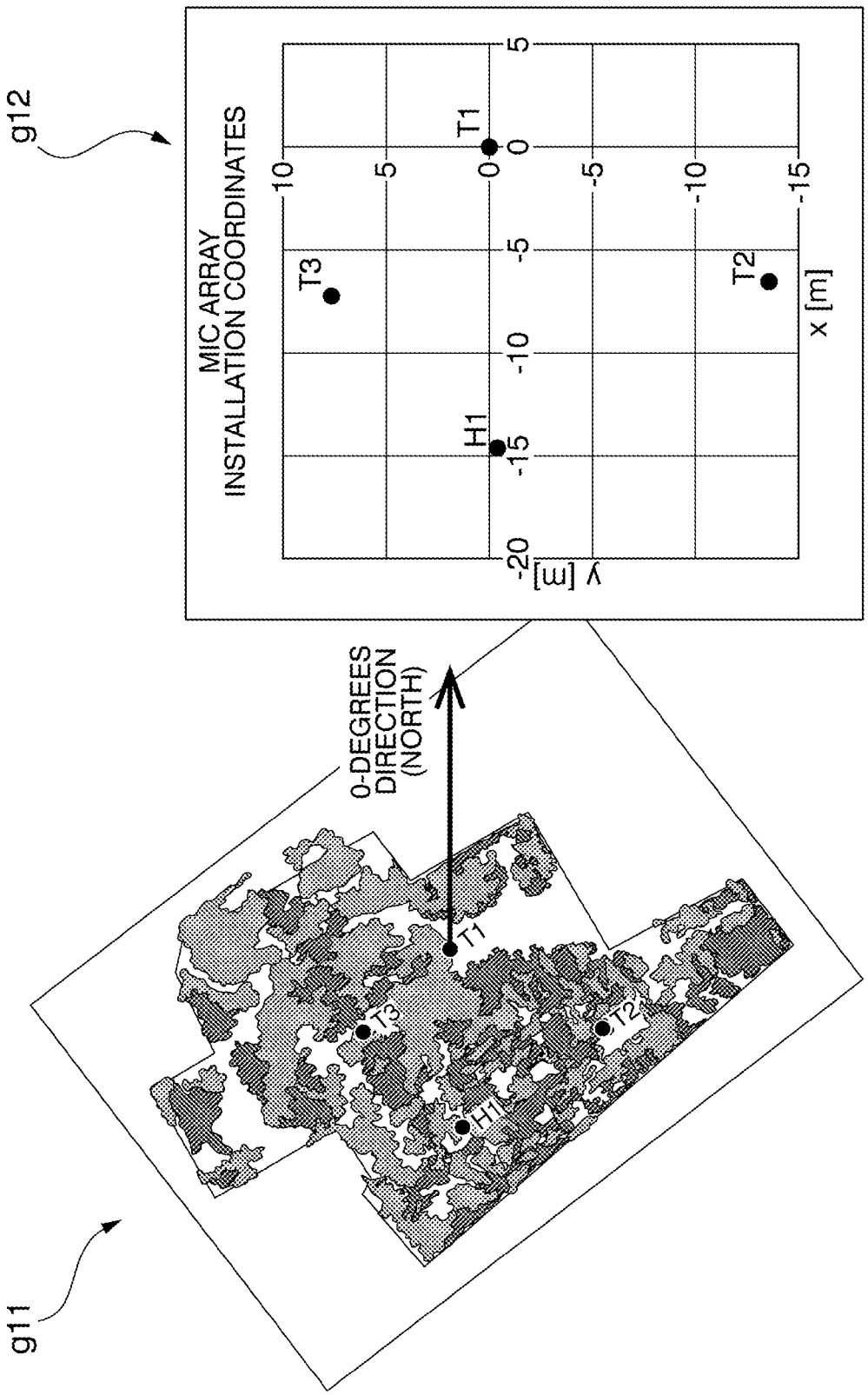
FIG. 7 is a diagram illustrating a disposition example of mic arrays.

FIG. 7 is a diagram illustrating a disposition example of mic arrays 10. In FIG. 7, reference numerals T1, T2, T3, and H1 each denotes the mic arrays 10 (see FIG. 1).

An image denoted by reference numeral g11 is a diagram illustrating disposition of the mic arrays T1, T2, T3, and H1 in the actual space. Reference numeral g12 denotes a diagram illustrating mic array installation coordinates on the xy plane. In FIG. 7, the horizontal direction and the north represent the x axis, the vertical direction and the west represent the y axis, the perpendicular direction and the upward represent the z axis. The origin is assumed to be T1. At the height z, a ground surface at the position of T1 is typically assumed to be a reference (z=0) irrespective of x and y. The north is assumed to a 0-degree direction of the azimuth on the xy plane. The height of each mic array from the ground is 1.3 m.

Figures 8, 9:
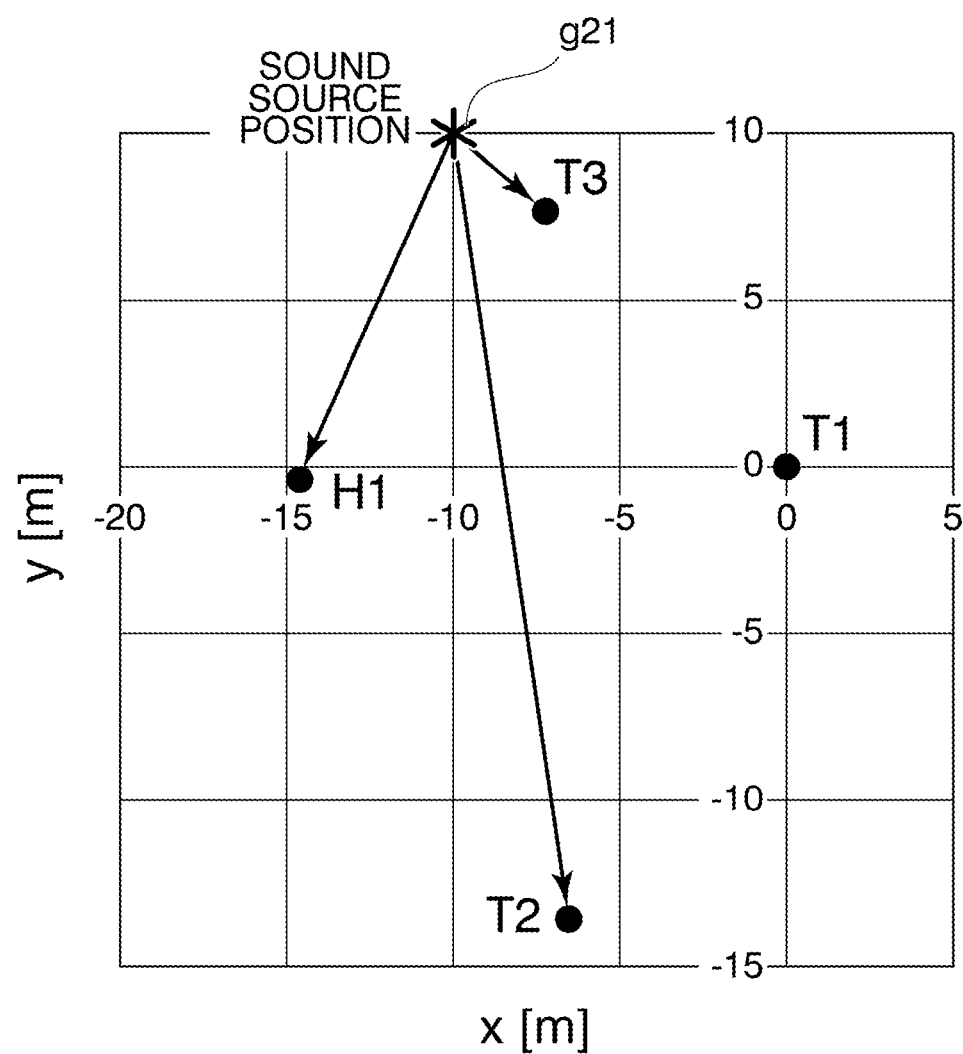
FIG. 8 is a diagram illustrating each coordinate of the mic array in FIG. 7.
FIG. 9 is a diagram illustrating a relation between a sound source position of the mic array and a selected separation sound.

FIG. 8 is a diagram illustrating each coordinate of the mic array in FIG. 7.

The mic arrays T3, H1, T2, and T1 are assumed to be mic array Nos. 1, 2, 3, and 4, respectively. In the example illustrated in FIG. 8, the mic array T1 (mic array No. 4) serves as a reference. In this case, for example, x, y, and z of the coordinates of the mic array T3 (mic array No. 1) are −7.3799 (m), 7.765218 (m), and 3.01621 (m), respectively.

[Decision Rules of Separation Sounds]

Next, decision rules of the separation sounds will be described.

FIG. 9 is a diagram illustrating a relation between a sound source position of the mic array and a selected separation sound. The coordinates in FIG. 9 and the positions of the mc arrays are the same as those in FIG. 7. Reference numeral g21 denotes a sound source position.

Coordinates (x, y, z) of the sound source position of reference numeral g21 are assumed to be (−10, 10, 2). In this case, the separation sound decision unit 509 selects the separation sound collected by the mic array T3 at a distance closest to a sound source among the mic arrays T1, T2, T3, and H1.

Figure 10:
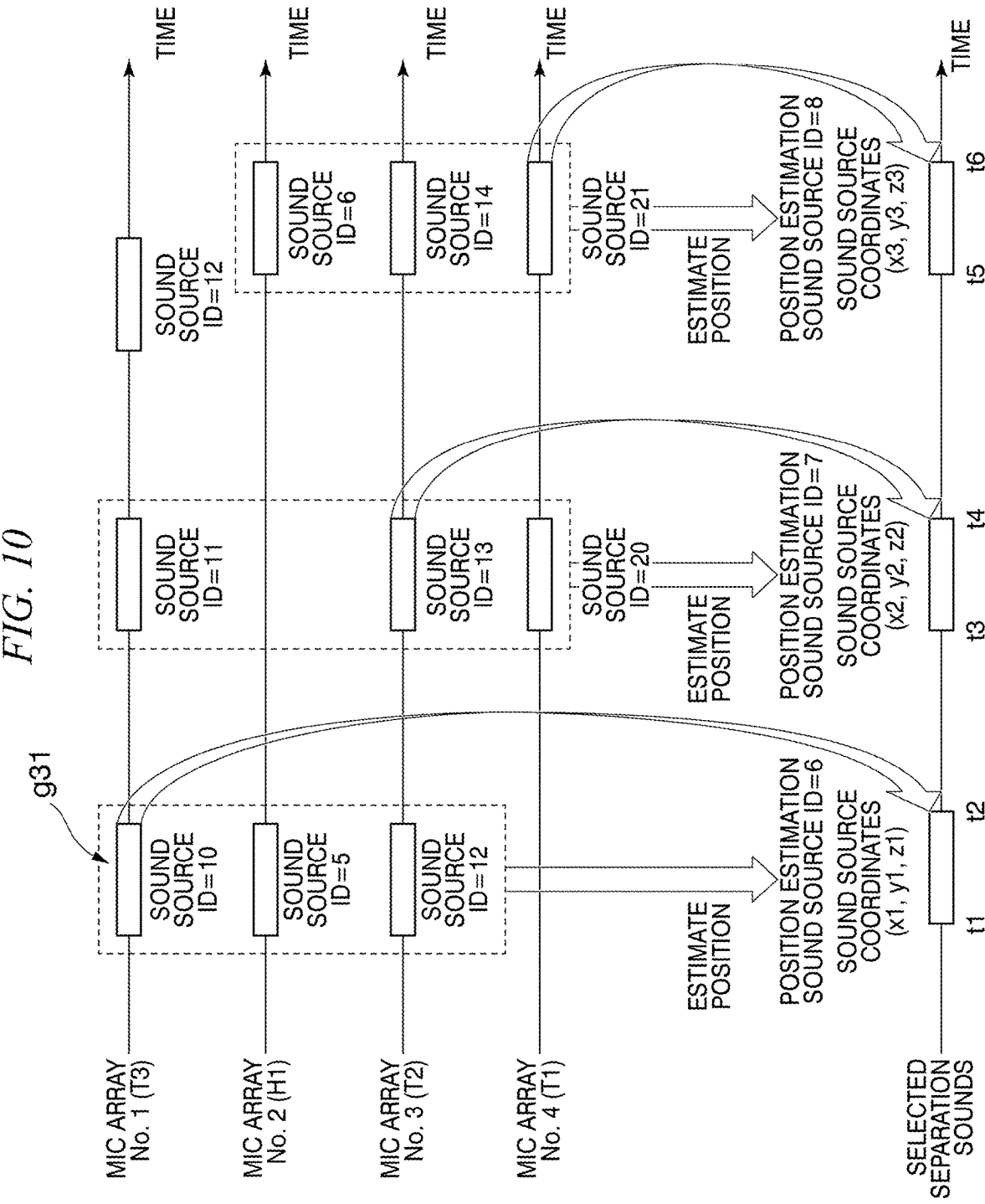
FIG. 10 is a diagram for describing a decision rule for a separation sound according to the first embodiment.

FIG. 10 is a diagram for describing a decision rule for a separation sound according to the first embodiment. In FIG. 10, the horizontal axis represents a time, reference numeral g31 schematically denotes a section of sound source localization and separation sounds.

The example illustrated in FIG. 10 is an example in which mic array No. 1 (T3) localizes sound sources ID=10, 11, and 12, mic array No. 2 (H1) localizes sound sources ID=5 and 6, mic array No. 3 (T2) localizes sound sources ID=12, 13, and 14, and mic array No. 4 (T1) localizes sound sources ID=20 and 21.

In FIG. 10, in a section of times t1 to t2, mic-array No. 1 (T3) localizes the sound source ID=10, mic-array No. 2 (H1) localizes the sound source ID=5, and mic-array No. 3 (T2) localizes the sound source ID=12.

The bird position estimation unit 505 of the analysis processing unit 50 estimates a sound source position (x1, y1, z1) of each of the sound sources ID=10, 5, and 12. Since the sound source positions are detected in the same section, the sound sources are estimated to be one sound source.

The separation sound decision unit 509 of the analysis processing unit 50 obtains a distance between the sound source position and the mic array No. 1 (T3), No. 2 (H1), and No. 3 (T2). Then, the separation sound decision unit 509 decides the sound source ID=6 of the mic array No. 1 (T3) closest to the sound source position as the separation sound.

The separation sound selection and position estimation sound source ID assigning unit 510 of the analysis processing unit 50 assigns the position estimation sound source ID=6 to the sound source ID=6 decided as the separation sound.

During a period of times t3 to t4, through a similar process, the separation sound decision unit 509 decides the sound source ID=13 of the mic array No. 3 (T2) closest to the sound source position as the separation sound and assigns the position estimation sound source ID=7 to the sound source ID=13 decided as the separation sound by the separation sound selection and position estimation sound source ID assigning unit 510.

During a period of times t5 to t6, through a similar process, the separation sound decision unit 509 decides the sound source ID=21 of the mic array No. 4 (T1) closest to the sound source position as the separation sound and assigns the position estimation sound source ID=8 to the sound source ID=21 decided as the separation sound by the separation sound selection and position estimation sound source ID assigning unit 510.

[Process Procedure Example]

Next, a process procedure example and a process timing example will be described.

Figure 11:
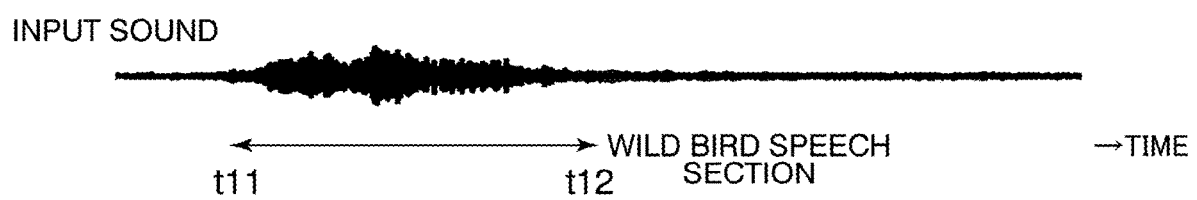
FIG. 11 is a diagram illustrating an input sound signal and a speech section.

FIG. 11 is a diagram illustrating an input sound signal and a speech section. In FIG. 11, the horizontal axis represents a time and the vertical axis represents the magnitude of a sound signal. The input sound signal input to the acoustic scene reconstruction device 1 is a cry of a wild bird. In the following description, it is assumed that a section of times t11 to t12 can be detected as a speech section of the wild bird.

Figure 12:
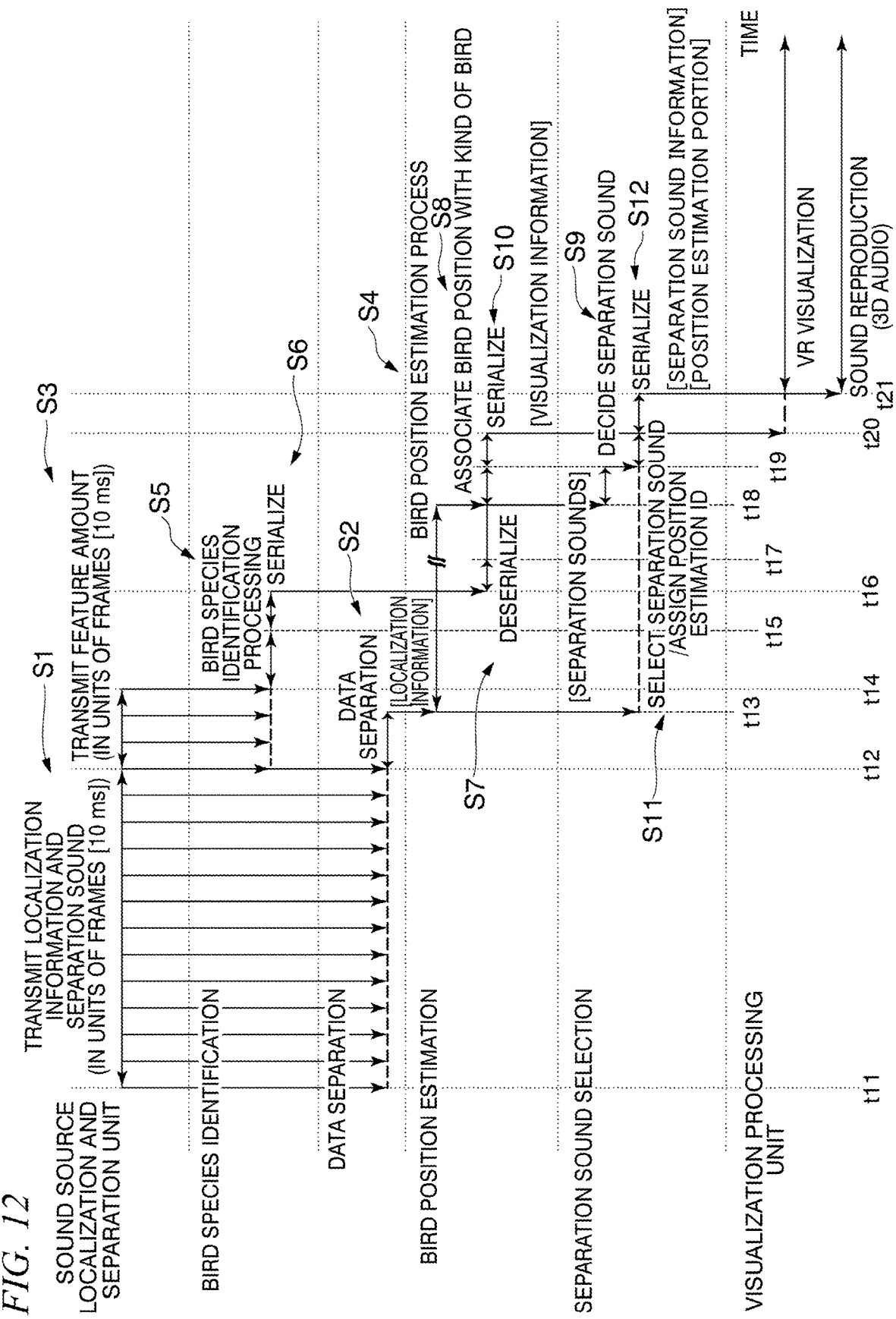
FIG. 12 is a diagram illustrating a process sequence example and a process timing example according to the first embodiment.

FIG. 12 is a diagram illustrating a process sequence example and a process timing example according to the first embodiment.

(Step S1) In the section of times t11 to t12, the sound source localization and separation unit 30 performs a sound source localization process and a sound source separation process and transmits the localization information, the separation sound, and the like which are a process result for each frame to the analysis processing unit 50. The frame is, for example, 10 [ms].

(Step S2) In a section of times t12 to t13, the data separation unit 504 of the analysis processing unit 50 separates the data.

(Step S3) In a section of times t12 to t14, the sound source localization and separation unit 30 transmits a feature amount or the like for frame to the bird species identification unit 40.

(Step S4) In a section of times t13 to t18, the bird position estimation unit 505 of the analysis processing unit 50 performs a bird position estimation process.

(Step S5) In a section of times t14 to t15, the identification unit 403N of the bird species identification unit 40 performs bird species processing.

(Step S6) In a section of times t15 to t16, the serialization unit 404N of the bird species identification unit 40 performs a serialization process.

(Step S7) In a section of times t16 to t17, the deserialization unit 502 of the analysis processing unit 50 returns the serialized data to the original data (deserialization).

(Step S8) In a section of times t18 to t19, the position and kind association unit 506 of the analysis processing unit 50 performs association of a bird position with a kind of bird.

(Step S9) In the period from time t18 to time t19, the separation sound decision unit 509 of the analysis processing unit 50 decides the separation sound.

(Step S10) In a section of times t19 to t20, the serialization unit 507 of the analysis processing unit 50 performs serialization of the visualization information.

(Step S11) In a section of times t19 to t20, the separation sound selection and position estimation sound source ID assigning unit 510 of the analysis processing unit 50 performs selection of the separation sound and assigning of the position estimation sound source ID.

(Step S12) In a section of times t20 to t21, the serialization unit 511 of the analysis processing unit 50 performs serialization of the separation sound information.

(Step S13) After time t21, the visualization processing unit 60 performs a VR visualization process and separation sound 3D processing. The VR goggles 70 displays the visualized 3D VR image and reproduces a 3D VR sound.

The process procedure and the timing illustrated in FIG. 12 are exemplary and the present invention is not limited thereto.

[Image Example Displayed in VR Goggles 70]

Next, an image example displayed in the image reproduction unit 702 (see FIG. 6) of the VR goggles 70 will be described.

Figure 13:
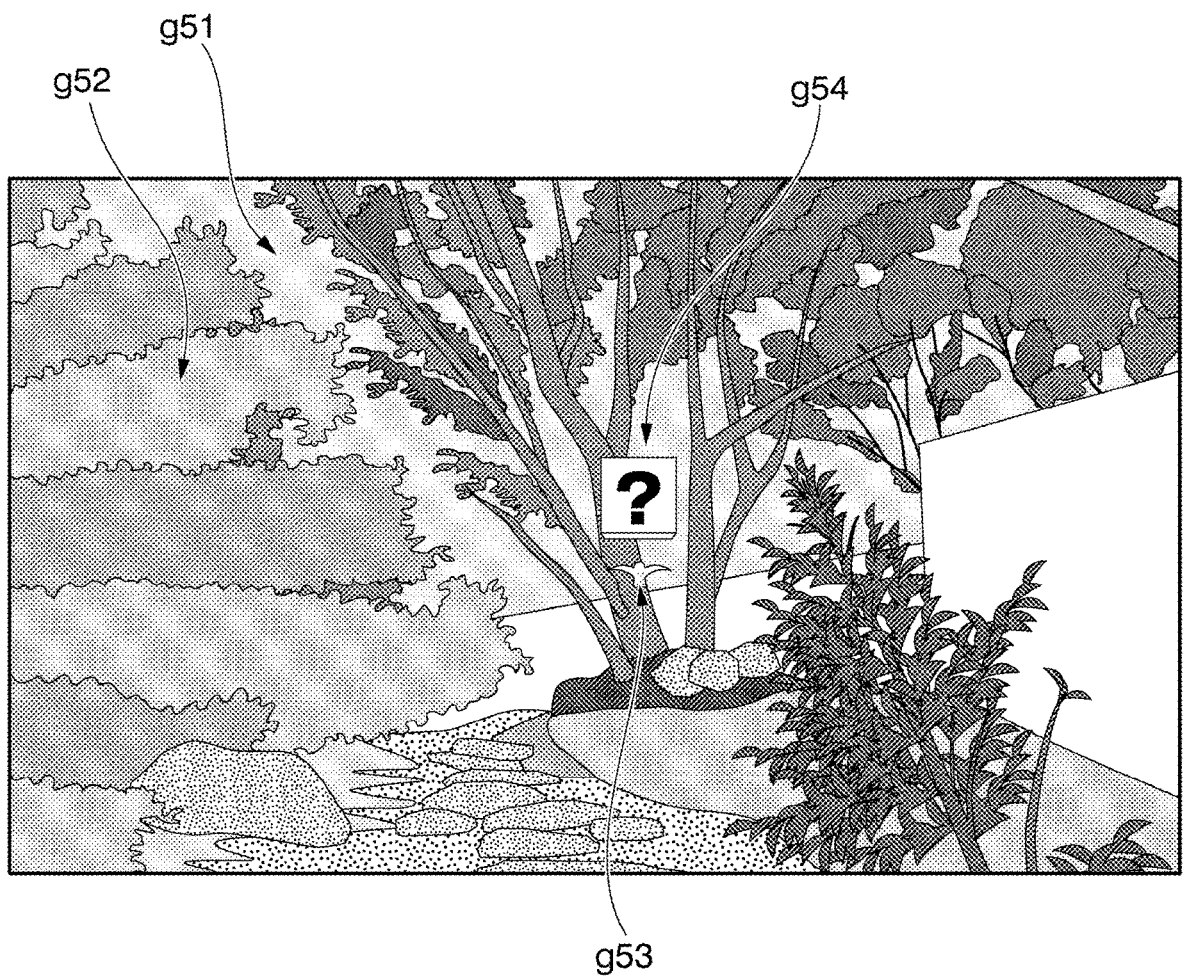
FIG. 13 is a diagram illustrating an image example displayed in an image reproduction unit of VR goggles according to the first embodiment.
Figure 14:
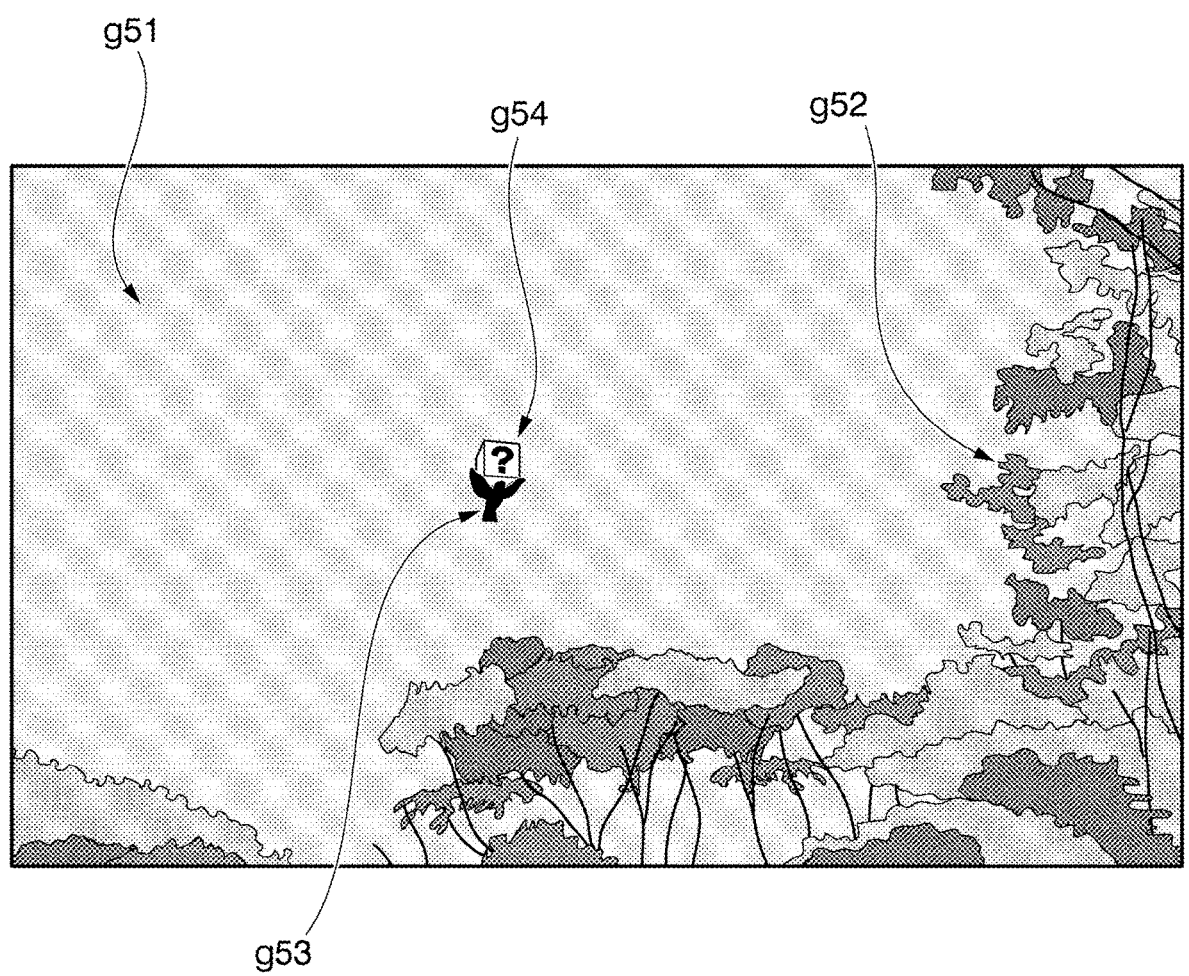
FIG. 14 is a diagram illustrating an image example displayed in the image reproduction unit of the VR goggles according to the first embodiment.

FIGS. 13 and 14 are diagrams illustrating an image example displayed in the image reproduction unit 702 of the VR goggles 70 according to the embodiment.

In FIGS. 13 and 14, reference numeral g51 denotes a VR image in a VR space, reference numeral g52 denotes an image of a plant object, reference numeral g53 denotes an image of a bird object, and reference numeral g54 denotes an image indicating a cry way of a bird. In the image denoted by reference numeral g54, an image of "?" indicates that the cry way may not be determined.

FIG. 13 illustrates an example of an image in which a wild bird is in a tree. FIG. 14 illustrates an example of an image in which the wild bird is flying. The bird species identification unit 40 and the analysis processing unit 50 estimates the position and kind of bird by the identification of a sound of the bird and sound source localization. Then, the analysis processing unit 50 performs comparison with an estimated estimation result of a subsequent estimation timing and determines that the same kind of bird located at a close place is the same bird. In this way, the analysis processing unit 50 identifies whether the bird is at a standstill or moving. Then, when the bird is moving (flying), the analysis processing unit 50 generates, for example, an image in which the bird is fluttering as visualization information. When the bird is at a standstill, the analysis processing unit 50 generates, for example, an image in which the bird is in a tree as visualization information.

Figure 15:
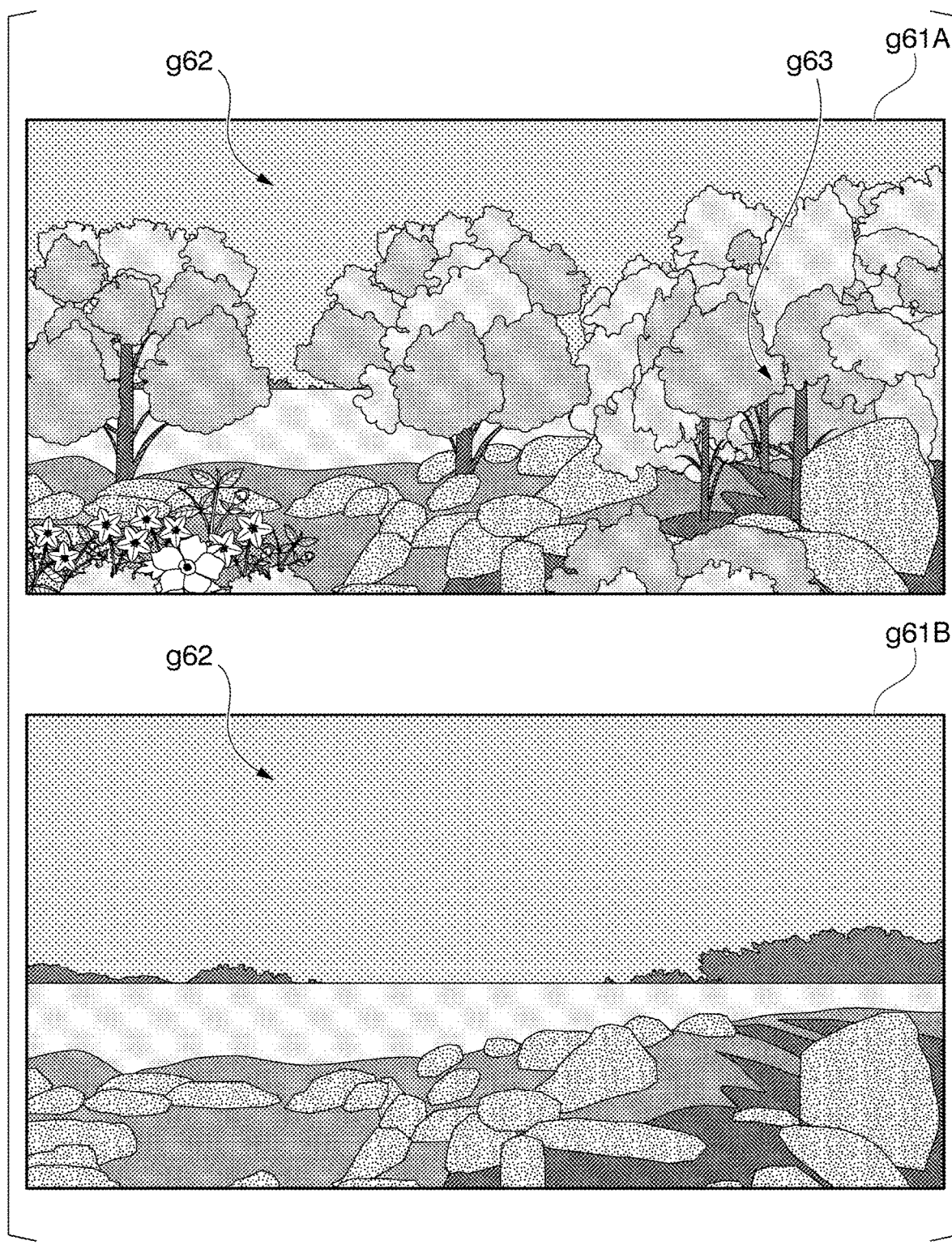
FIG. 15 is a diagram illustrating an image example in a display state of a plant object and an image example in a non-display state of the plant object according to the first embodiment.

FIG. 15 is a diagram illustrating an image example in a display state of a plant object and an image example in a non-display state of the plant object according to the first embodiment.

In FIG. 15, an image denoted by reference numeral g61A is an image in a display state of the plant object and an image denoted by reference numeral g61B is an image in a non-display state of the plant object. Reference numeral g62 denotes a VR image of a VR space and reference numeral g63 denotes an image of a plant object. In the acoustic scene reconstruction device 1, display and non-display of a plant object can be switched in this way. The switching may be performed in the operation unit 707 (see FIG. 6) included in the VR goggles 70 or the operation unit 610 (see FIG. 5) included in the visualization processing unit 60 by a user of the VR goggles 70 or an operator of the acoustic scene reconstruction device 1.

Figure 16:
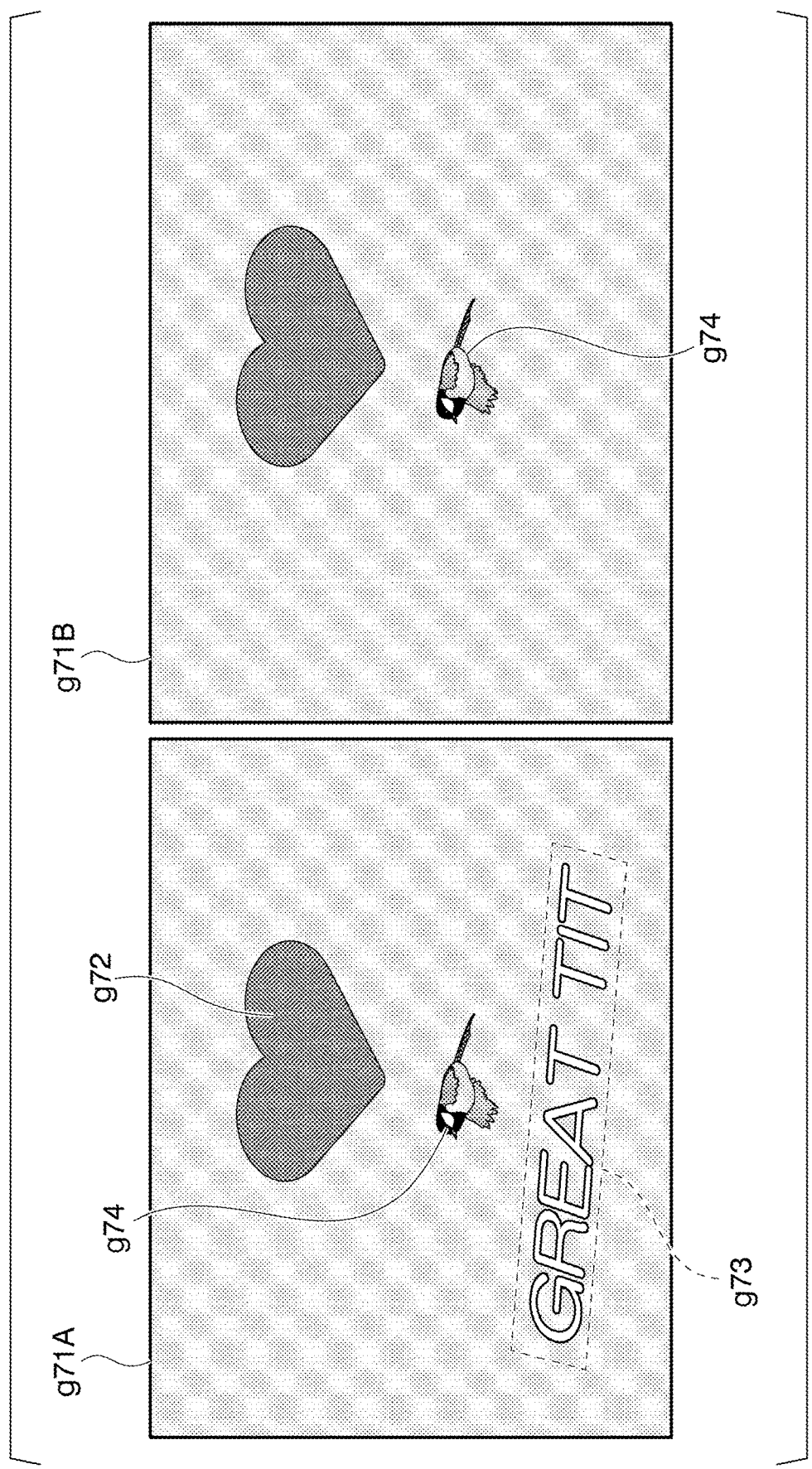
FIG. 16 is a diagram illustrating an image example in a display state of a kind of bird (a name of the bird) and an image example in a non-display state of the kind of bird (the name of the bird) according to the first embodiment.

FIG. 16 is a diagram illustrating an image example in a display state of a kind of bird (a name of the bird) and an image example in a non-display state of the kind of bird according to the embodiment.

In FIG. 16, an image denoted by reference numeral g71A is an image in a display state of a kind of bird (the name of the bird) and an image denoted by reference numeral g71B is an image in a non-display state of the kind of bird (the name of the bird). Reference numeral g72 denotes a 3D VR image of a wild bird, reference numeral g73 denotes an image of a kind of bird (the name of the bird), and reference numeral g74 denotes an image representing a cry way of the bird. An image of a heart mark denoted by reference numeral g74 represents "song" which is a cry way. In this way, in the embodiment, in accordance with the cry way, the image representing the cry way may be displayed near the 3D VR image of the bird. Thus, the user can know the kind of cry way of the bird. In the acoustic scene reconstruction device 1, display and non-display of the kind of bird (the name of the bird) can be switched in this way. The switching may be performed in the operation unit 707 (see FIG. 6) included in the VR goggles 70 or the operation unit 610 (see FIG. 5) included in the visualization processing unit 60 by a user of the VR goggles 70 or an operator of the acoustic scene reconstruction device 1.

The image combination unit 607 combines the image of the kind of bird (the name of the bird) so that the image does not overlap the 3D VR image of the bird near the 3D VR image of the bird based on the bird coordinates. The image is displayed, for example, below the bird object (the 3D VR image of the bird). The kind of bird (the name of the bird) is stored in the image model storage unit 606.

Figure 17:
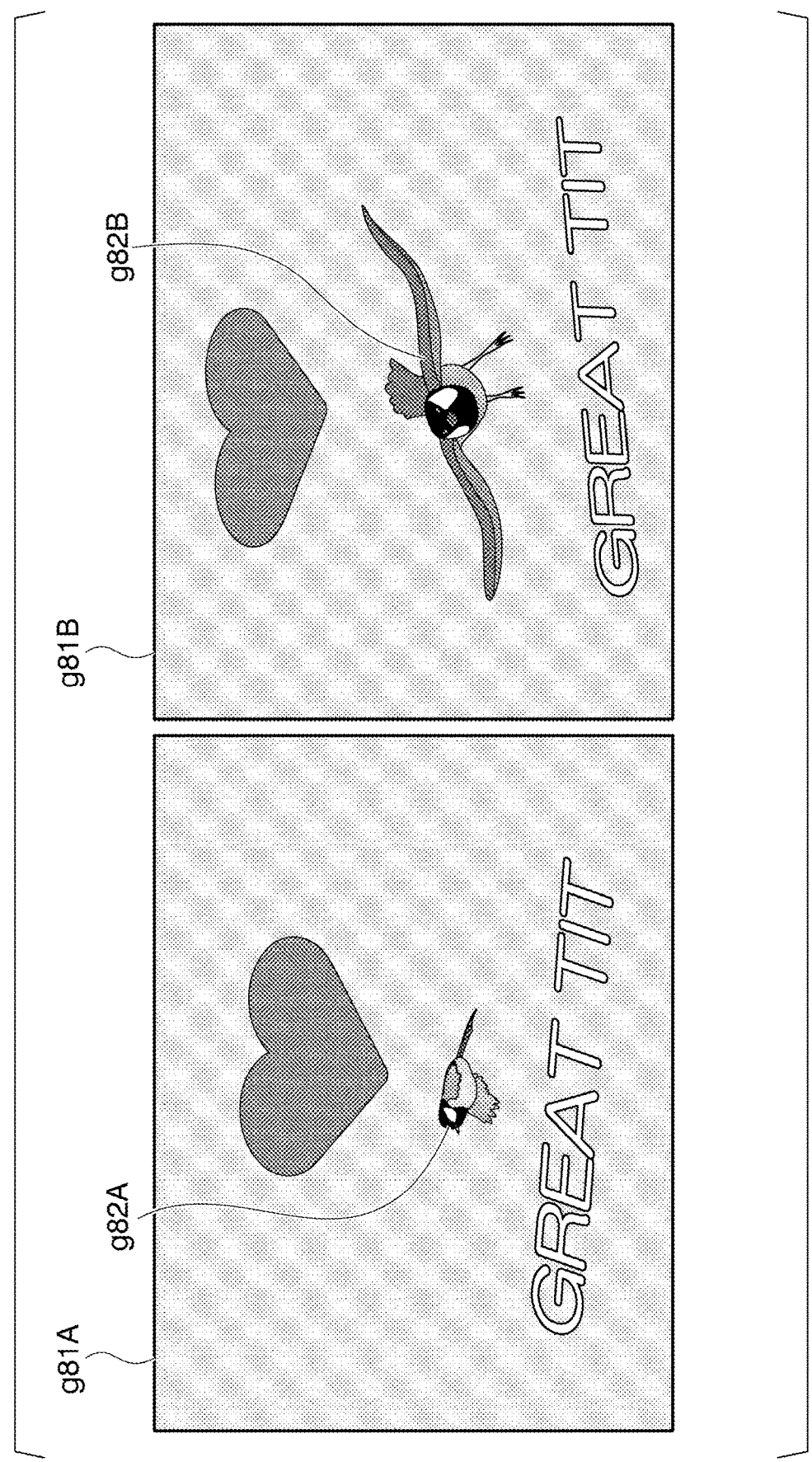
FIG. 17 is a diagram illustrating an example of actual size display of a bird object and expanded display of the bird object according to the first embodiment.

FIG. 17 is a diagram illustrating an example of actual size display of a bird object and expanded display of the bird object according to the embodiment.

In FIG. 17, an image denoted by reference numeral g81A is an image in a state in which the image of a wild image is displayed with an actual size and an image denoted by reference numeral g81B is an image in a state in which the image of the wild bird is expanded and displayed. Reference numeral g82A denotes a 3D VR image with the actual size and reference numeral g82B denotes a 3D VR image expanded five times. In the acoustic scene reconstruction device 1, the size of display of the bird can be switched in this way. The switching may be performed in the operation unit 707 (see FIG. 6) included in the VR goggles 70 or the operation unit 610 (see FIG. 5) included in the visualization processing unit 60 by a user of the VR goggles 70 or an operator of the acoustic scene reconstruction device 1.

Thus, it is possible to improve visibility of the wild bird in the VR space. The expanded size is, for example, a maximum of about 5 times (which depends on the actual size of the wild bird).

When the wild bird is detected at hidden display position rear the above-described plant object, a rock object, or the like, an image of the wild bird may be disposed in a layer in front of the object to be combined. The switching may be performed in the operation unit 707 (see FIG. 6) included in the VR goggles 70 or the operation unit 610 (see FIG. 5) included in the visualization processing unit 60 by a user of the VR goggles 70 or an operator of the acoustic scene reconstruction device 1.

Thus, even when an object is between the user and the wild bird and the image of the wild bird is concealed and not seen, the image of the wild bird can be displayed.

[Data Configuration Example Output by Mic Array 10]

Next, a data configuration example output by the mic array 10 will be described.

FIG. 18 is a diagram illustrating a data configuration example output by the mic array 10 according to the first embodiment. As illustrated in FIG. 18, elements of data output by the mic array 10 includes a format version, a recording start date, a recording start time, a recording place, a mic array (mic array) model name, information regarding each mic array (a serial number of each mic array (a mic array number), a name, an installation position), a sampling frequency of recorded sound data, the number of bits of the recorded sound data, and an event data updating frequency. The recording start date may be a year, a month, and a day or may be a season. The event data updating frequency is an interval of transmission in steps S1 and S2 in FIG. 12 (frame time). The data is recorded in, for example, Extensible Markup Language (XML) which is a kind of markup language.

The constituent elements of the data illustrated in FIG. 18 are exemplary and the present invention is not limited thereto.

[Event Data Configuration Example Output by Sound Source Localization and Separation Unit 30]

Next, an event data configuration example output by the sound source localization and separation unit 30 will be described.

FIG. 19 is a diagram illustrating an event data configuration example output by the sound source localization and separation unit 30 according to the embodiment. As illustrated in FIG. 19, the event data includes a frame number, information regarding each bird (a position estimation sound source ID, a kind of bird, a cry way of a bird, bird coordinates (x, y, z), a bird roll angle (deg), a bird pitch angle (deg), a bird yaw angle (deg), presence or absence of a cry of the bird, and presence or absence of flutter of the bird). The number of frames is the number of frames from the beginning. The information regarding the bird is described for each bird. It is assumed that the bird roll angle is right and left inclination, 0 is horizontal, a range is −360 to 0 and 0 to 360, and clockwise rotation is positive. It is assumed that the bird pitch angle is front and rear inclination, 0 is horizontal, a range is −360 to 0 and 0 to 360, and clockwise rotation is positive. It is assumed that the bird yaw angle is a rotation angle of a bird when viewed from the upper side of a VR space, 0 is the north, a range is −360 to 0 and 0 to 360, and clockwise rotation is positive. The absence of the cry is a case in which there is no separation sound corresponding to the bird. For the presence of flutter, an animation in which wings are moving is displayed. For the absence of flutter, an animation in which wings are moving is not displayed. For example, when a bird is determined to be flying, the bird roll angle, the bird pitch angle, and the bird yaw angle are set as angles at which the head of a bird is oriented in a flying direction.

For the presence or absence of flutter of the bird, for example, the sound source localization and separation unit 30 determines that, for example, the cry way of the bird is singing while the bird is flying in the case of valley-to-valley and there is the presence of flutter.

The data is described in, for example, Extensible Markup Language (XML) which is a kind of markup language. The data output by the bird species identification unit 40 may have a JavaScript (registered trademark) object notation (JSON) format.

[Data Example of Kinds of Birds]

Next, a data example of the kind of bird will be described.

FIG. 20 is a diagram illustrating a data example of the kind of bird according to the embodiment.

The acoustic model storage unit 402N of the bird species identification unit 40 stores the kinds of birds illustrated in FIG. 20. The acoustic model storage unit 402N associates, for example, numbers, wild bird names (Japanese names), and wild bird names (English names) for storage. For example, the acoustic model storage unit 402N associates a wild bird name (Japanese name) with Japanese Bush Warbler and wild bird name (English name) with Japanese Bush Warbler in number 1 for storage. The kind of bird output by the bird species identification unit 40 may be at least one of a number, a wild bird name (Japanese name), and a wild bird name (English name).

The data is described in, for example, Extensible Markup Language (XML) which is a kind of markup language. The data output by the bird species identification unit 40 may have a JavaScript (registered trademark) object notation (JSON) format.

[Data Example of Cry Way of Bird]

Next, a data example of the cry way of a bird will be described.

Figures 21, 22:
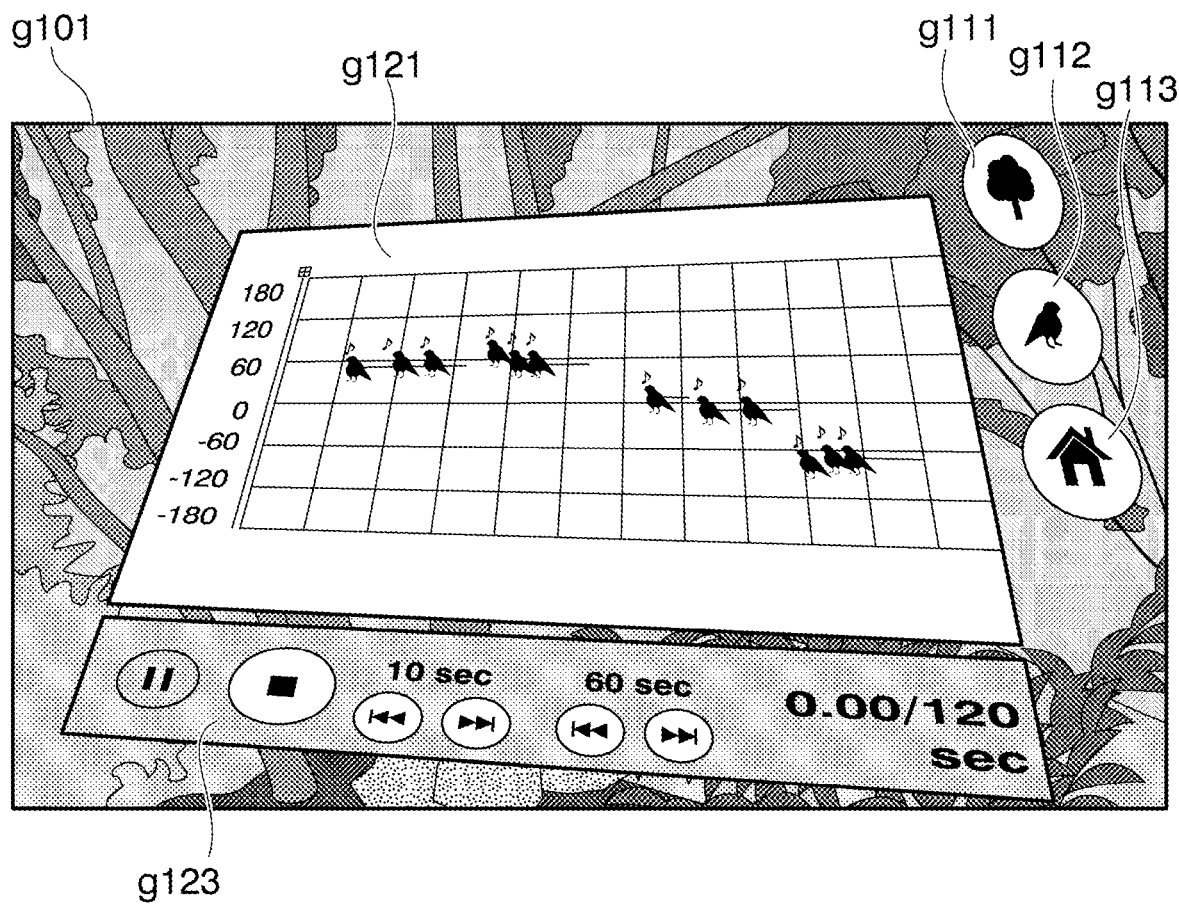
FIG. 21 is a diagram illustrating a data example of a cry way of a bird according to the first embodiment.
FIG. 22 is a diagram illustrating an image example displayed on a display device when display, non-display, and the like of objects are set according to the first embodiment.

FIG. 21 is a diagram illustrating a data example of a cry way of a bird according to the first embodiment.

The acoustic model storage unit 402N of the bird species identification unit 40 stores cry ways of birds, as illustrated in FIG. 21. The acoustic model storage unit 402N associates, for example, numbers, cry ways (Japanese names), and cry ways (English names) for storage. For example, the acoustic model storage unit 402N associates a cry way (Japanese name) with a call and a cry way (English name) with a call in number 1 for storage. The cry way output by the bird species identification unit 40 may be at least one of a number, a cry way (Japanese name), and a cry way (English name).

The data is described in, for example, Extensible Markup Language (XML) which is a kind of markup language.

[Image Example Displayed on Display Device]

Next, an image example displayed on the display device 62 (see FIG. 5) at the time of setting of display and non-display of objects or the like will be described.

FIG. 22 is a diagram illustrating an image example displayed on the display device 62 when display and non-display of objects are set according to the embodiment.

In FIG. 22, an image g101 is an image displayed in the VR goggles 70 and an image gill is an image of an operation button for switching between the display and non-display of a plant object described above. An image g112 is an image of an operation button for switching between the display and non-display of a kind of bird described above. An image g113 is an image of an operation button for returning to a setting home screen (opening screen). An image g121 is a display image of results of the kinds and cries of birds recognized by the acoustic scene reconstruction device 1. An image g122 is an example of an operation screen of reproduction of a VR image (including a sound).

A display image illustrated in FIG. 22 is exemplary and the present invention is not limited thereto.

[Identification Results of Cry Ways of Birds, Kinds of Birds, and Noise by CNN]

Next, cry ways of birds, kinds of birds, and noise identification result examples by the bird species identification unit 40 of the acoustic scene reconstruction device 1 according to the embodiment will be described.

FIG. 23 is a diagram illustrating identification result examples of cry ways of birds, kinds of birds, and noise by the bird species identification unit 40 according to the embodiment.

In FIG. 23, the horizontal direction represents a recognition result for each frame and the vertical direction represents a correct label for each frame. In validation, 5-fold cross-validation has performed. Noise components of a car and the like are also stored in the acoustic model storage unit 402N. As illustrated in FIG. 23, an average frame correct ratio was 81.52%.

As described above, in the embodiment, a cry of a bird was collected and identification information of the kinds of birds, phrase information, positional information, and a motion were constructed from the sound data along with sound source localization or sound source separation. In the embodiment, based on the data reconstructed in this way, visualized and stereoscopic sounds were generated and reproduced in the VR goggles 70.

In the case of VR display, for example, when the user wanders in a room or looks up, a 3D VR image is displayed and 3D VR sound is reproduced in the VR goggles 70. Thus, for example, the user can increasingly observe wild birds in a forest and visually experience the cries.

Thus, according to the embodiment, it is possible to visualize and display the kinds of birds and the cry ways. According to the embodiment, the user can further experience previously recorded data by performing VR reproduction.

In the above-described example, the example in which a sound signal including cries of birds are collected and sound source localization, sound source separation, and identification of the kinds of birds and the cry ways are performed has been described, but the present invention is not limited thereto. Identification targets may be others. In this case, identification targets may be stored in the acoustic model storage unit 402N and images to be displayed may be stored in the image model storage unit 606.

In the above-described example, sound source positions are moved since birds fly around. Therefore, it is necessary for the acoustic scene reconstruction device 1 to follow a moving sound source. As a scheme of following a sound source, for example, a scheme disclosed in Japanese Patent No. 5170440 or Japanese Unexamined Patent Application, First Publication No. 2017-067879 is used.

The visualization processing unit 60 may switch a background image to an image corresponding to a season based on a collected recording start date (see FIG. 18). Alternatively, the user may operate the operation unit 707 of the VR goggles 70 or perform an operation through a controller (the display device 62) to switch the background image to an image corresponding to a season.

Second Embodiment

In the first embodiment, the example in which the VR image (including a sound) is reproduced in the VR goggles 70 has been described. In the embodiment, an example in which an AR image (including a sound) is reproduced in the VR goggles 70 will be described. By reproducing an AR image, it is possible to display a kind of bird and a cry way at a location at which there is the bird in real time.

The configuration of the acoustic scene reconstruction device 1 that performs AR display is the same as that of the first embodiment. A difference is a process of each functional unit.

In the case of the AR display, a sound signal collected by the mic array 10 (see FIG. 1) is processed in real time by the sound source localization and separation units 30, the bird species identification units 40, the analysis processing unit 50, and the visualization processing unit 60.

The visualization processing unit 60 performs control such that a 3D VR image of a bird object is displayed in a VR space via the VR goggles 70.

The visualization processing unit 60 generates 3D VR images in which birds generated with CG are displayed with animations based on, for example, XML data and generates 3D VR sounds in which 3D audio cries are reproduced from the positions of the birds. In the AR display, for example, the kinds of cries are displayed above the birds and the names of the birds are displayed below the birds.

A user freely walks along the topography of a space (here, a room scale). For a walking state and a position of the user, the visualization processing unit 60 determines a position or a state of the user based on detection values of the sensor 705 (see FIG. 6) included in the VR goggles 70, and a 3D VR image and a 3D VR sound are generated.

Alternatively, the user may move in the space using a controller (the display device 62) connected to the control unit 611 of the visualization processing unit 60.

Figure 24:
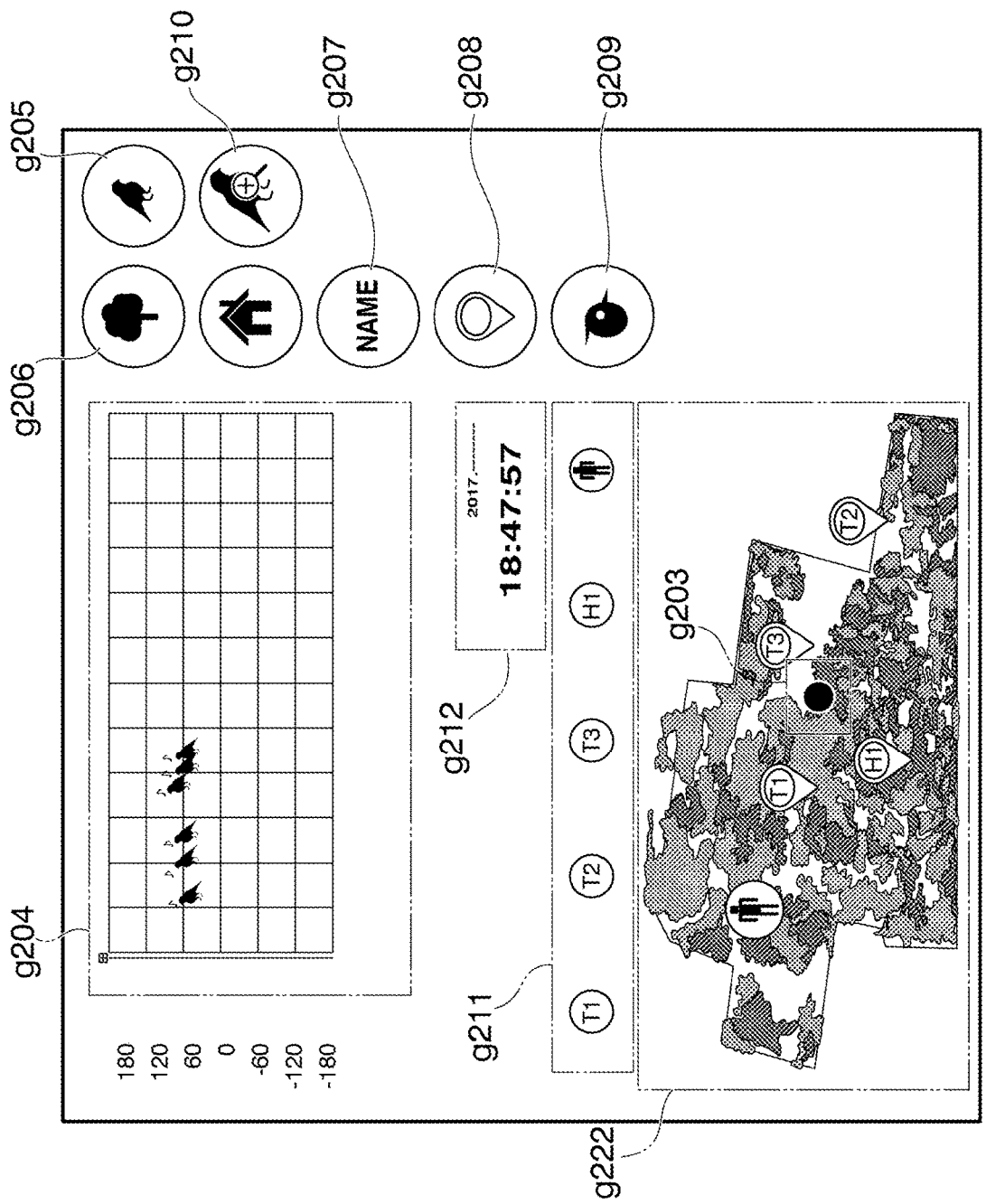
FIG. 24 is a diagram illustrating a screen example displayed on a controller (display device) at the time of AR display according to a second embodiment.

FIG. 24 is a diagram illustrating a screen example displayed on the controller (the display device 62) at the time of AR display according to the embodiment.

A region denoted by reference numeral g202 is a region in which a current place and a direction on a map and singing wild birds are displayed. Thus, a direction suitable for the user is reflected in an arrow in real time and a wild bird which is singing at a current time is displayed.

Reference numeral g203 is a warp setting image. When the user points in the range of the map with the controller, an image which the user is seeing is warped at that place. A range in which the warp is possible is within a movable range. In a direction in a warp destination, a currently oriented direction is maintained.

A region denoted by reference numeral g204 is a region in which a current time and cries are displayed in a timeline.

The visualization processing unit 60 deletes rewinding and fast-forwarding functions of the display in real time. The horizontal axis represents a time and the vertical time represents an angle (−180 to 0 and 0 to 180).

Reference numeral g205 denotes an image of a button switching between an ON state and an OFF state of reproduction of a cry.

In the ON state, for example, a list of wild birds is displayed on the right side of a graph, and a specific wild bird and a kind of cry of the wild bird can be filtered from the list. FIG. 25 is a diagram illustrating an image example of a list of wild birds according to the embodiment. As illustrated in FIG. 25, kinds (names) of birds and images of selection buttons for cries of the kinds of birds are displayed in the image of the list.

In FIG. 25, reference numeral g251 denotes images of buttons for switching between an ON state and an OFF state of reproduction of cries. Reference numeral g252 denotes images of birds. Reference numeral g253 denotes images of kinds (names) of birds.

Reference numeral g260 denotes selection images of cries. For example, colors of images of selection buttons of selectable cries are changed and displayed.

Reference numeral g261 denotes an image of a button for selecting a cry which is "unknown." Reference numeral g262 denotes an image of a button for selecting a cry which is "call." Reference numeral g263 denotes an image of a button for selecting a cry which is "song." Reference numeral g264 denotes an image of a button for selecting a cry which is "valley-to-valley." Reference numeral g265 denotes an image of a button for selecting a cry which is "threat." Reference numeral g266 denotes an image of a button for selecting a cry which is "alarm call." Reference numeral g267 denotes an image of a button for selecting a cry which is "drumming."

Referring back to FIG. 24, the description will be made.

Reference numeral g206 denotes an image of a button for switching between display and non-display of a plant object.

Reference numeral g207 denotes an image of a button for switching between display and non-display of a kind (name) of bird.

Reference numeral g208 denotes an image of a button for switching between display and non-display of the mic array 10.

When the plurality of mic arrays 10 are installed in the space, display can be switched for each mic array 10.

Reference numeral g209 denotes an image of a button for switching a display method when a wild bird is concealed behind an object.

Reference numeral g210 denotes an image of a button for performing expansion display of a wild bird.

Reference numeral g210 denotes an image of a button for switching graph angle display denoted by reference numeral g204. Reference numeral g210 denotes an image of a button for switching angle display centering on the position of each of the user and each mic array 10 on the graph.

Reference numeral g211 denotes an image of time display and display switching buttons. When a clock portion is clicked, a time (JST) of actual recording and a time from the time of file reproduction are switched.

The images illustrated in FIGS. 24 and 25 are exemplary and the present invention is not limited thereto. The setting images illustrated in FIGS. 24 and 25 are also used at the time of the VR display.

As described above, in the embodiment, the setting screens and operation systems illustrated in FIGS. 24 and 25 are provided.

Thus, according to the embodiment, the user or the operator can simply operate the 3D VR image displayed in the VR goggles 70.

A convolution neural network (CNN) that is used for classification of cries of birds will be described.

Figure 26:
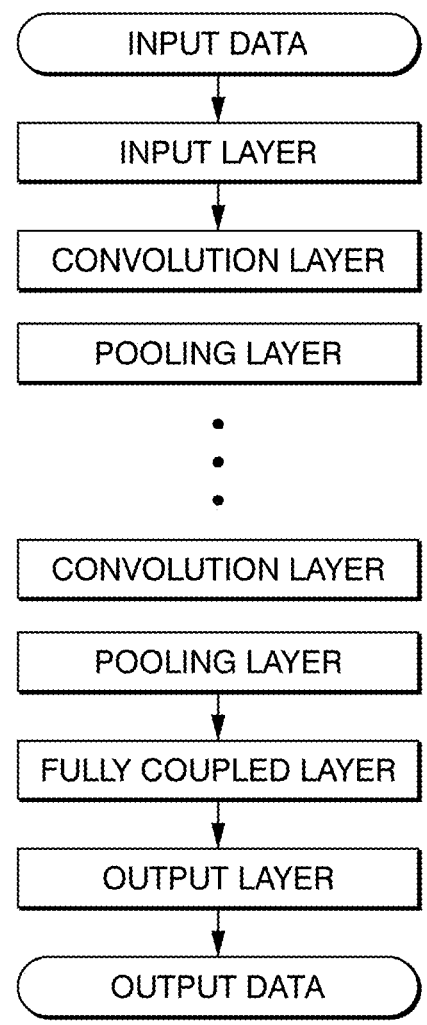
FIG. 26 is a diagram illustrating a processing example of a convolution neural network.

FIG. 26 is a diagram illustrating a processing example of the convolution neural network.

As illustrated in FIG. 26, in intermediate layers, mainly convolution layers and pooling layers are repeated alternately, features of data are extracted, and recognition is performed in a fully coupled layer finally. Here, pooling is a process of taking a maximum value or an average value locally and is performed in order to obtain invariability of local data.

Through this process, the classification into the cries of the birds is performed.

In the embodiment, the example in which the background image of the 3D VR, the 3D VR image of the birds, the kinds of birds, and the cry ways of the birds are displayed as visualization images in the VR goggles has been described, but the present invention is not limited thereto. For example, in the actual space, the acoustic scene reconstruction device 1 may perform sound collection and analysis of sound signals in real time and combine the kinds of birds and the cry ways of the birds with the real image of the actual space seen through the display in the VR goggles for display.

Some or all of the processes performed by the acoustic scene reconstruction device 1 may be performed by recording a program realizing some or all of the functions of the acoustic scene reconstruction device 1 according to the present invention on a computer-readable recording medium and causing a computer system to read and execute the program recorded on the recording medium. The "computer system" mentioned here is assumed to include an OS or hardware such as peripheral devices. The "computer system" is assumed to also include a WWW system that has a home page providing environment (or a display environment). The "computer-readable recording medium" is a portable medium such as a flexible disc, a magneto-optical disc, a ROM, a CD-ROM or a storage device such as a hard disk contained in the computer system. Further, the "computer-readable recording medium" is assumed to include a medium that retains a program for a given time, such as a volatile memory (RAM) in a computer system serving as a server or a client when a program is transmitted via a network such as the Internet or a communication circuit such as a telephone circuit.

The program may be transmitted from a computer system that stores the program in a storage device or the like to another computer system via a transmission medium or by transmission waves in a transmission medium. Here, the "transmission medium" transmitting the program is a medium that has a function of transmitting information, such as a network (communication network) such as the Internet or a communication circuit (communication line) such as a telephone circuit. The program may be a program realizing some of the above-described functions. Further, the program may also be a program in which the above-described functions can be realized in combination with a program which has already been recorded in a computer system, a so-called a differential file (differential program).

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An acoustic scene reconstruction device comprising:
    a sound source localization and separation unit configured to perform sound source localization and sound source separation from a collected sound signal;
    an identification unit configured to identify a kind of a sound source contained in the sound signal;
    an analysis processing unit configured to estimate a position of the sound source based on a result obtained through the sound source localization and the sound source separation performed by the sound source localization and separation unit and a result obtained through the identification by the identification unit, select a separation sound based on a result obtained by estimating the position of the sound source, and generate visualization information by associating the result obtained by estimating the position of the sound source with a kind of a sound signal in accordance with the sound source; and
    a visualization processing unit configured to generate an image in which an image corresponding to the sound source is displayed at the estimated position of the sound source by using the visualization information and the separation sound and generate a sound in which the separation sound is reproduced at the estimated position of the sound source.

2. The acoustic scene reconstruction device according to claim 1,
    wherein the sound source localization and separation unit performs the sound source localization on a sound source direction of the sound source, performs the sound source separation to separate the separation sound, assigns identification information of the sound source to each sound source localized based on a result of the sound source localization, outputs sound source identification information to which the identification information is assigned for each localized sound source, information regarding the sound source direction, and the separation sound subjected to the sound source separation to the analysis processing unit, extracts an acoustic feature amount from the separation sound, and outputs the acoustic feature amount to which the identification information of the sound source is assigned for each localized sound source to the identification unit, and
    wherein the identification unit acquires the sound source identification information, information regarding the sound source direction, and the separation sound subjected to the sound source separation for each localized sound source output by the sound source localization and separation unit, identifies the kind of the sound source contained in the sound signal for each acquired sound source, and outputs the sound source identification information and an identification result which is an identified result to the analysis processing unit for each localized sound source.

3. The acoustic scene reconstruction device according to claim 1,
    wherein the collection of the sound signal is performed by a mic array including M (where M is an integer equal to or greater than 2) microphones, and the number of mic arrays is N (where N is an integer equal to or greater than 2),
    wherein the sound source localization and separation unit is provided for each of the mic arrays, sound signals of M channels collected by an L (where L is an integer from 1 to N)-th mic array are input to an L-th sound source localization and separation unit,
    wherein the identification unit is provided for each sound source localization and separation unit, an L-th sound source localization and separation unit is connected to an L-th identification unit, and
    wherein the analysis processing unit acquires sound source identification information to which identification information is assigned for each of the localized sound sources output by the first to N-th sound source localization and separation units, information regarding a sound source direction, and the separation sound subjected to the sound source separation, estimates the position of the sound source corresponding to the separation sound for each acquired separation sound based on the separation sounds of the plurality of microphones, and selects the separation sound by the mic array closest in distance to the separation sound among the plurality of separation sounds when the plurality of sound source localization and separation units simultaneously detect the separation sound.

4. The acoustic scene reconstruction device according to claim 1,
wherein the sound signal is a bird cry of a bird, and
wherein the kind of the sound source contained in the sound signal is a name of the bird and a cry way of the bird.

5. The acoustic scene reconstruction device according to claim 1, comprising:
a controller configured to set the image and the sound generated by the visualization processing unit,
wherein at least one of an operation of switching between display and non-display of the kind of the sound source contained in the sound signal and an operation of switching display magnification of the kind of the sound source contained in the sound signal is performed by operating the controller, and an operated operation result is output to the visualization processing unit.

6. An acoustic scene reconstruction method comprising:
a sound source localization and separation step in which a sound source localization and separation unit performs sound source localization and sound source separation from a collected sound signal;
an identification step in which an identification unit identifies a kind of a sound source contained in the sound signal;
a step in which an analysis processing unit estimates a position of the sound source based on a result obtained through the sound source localization and the sound source separation performed by the sound source localization and separation step and a result obtained through the identification by the identification step, selects a separation sound based on a result obtained by estimating the position of the sound source, and generates visualization information by associating the result obtained by estimating the position of the sound source with a kind of a sound signal in accordance with the sound source; and
a step in which a visualization processing unit generates an image in which an image corresponding to the sound source is displayed at the estimated position of the sound source by using the visualization information and the separation sound and generates a sound in which the separation sound is reproduced at the estimated position of the sound source.

7. A computer-readable non-transitory recording medium that includes a program causing a computer of an acoustic scene reconstruction device to execute:
a sound source localization and separation step of performing sound source localization and sound source separation from a collected sound signal;
an identification step of identifying a kind of a sound source contained in the sound signal;
a step of estimating a position of the sound source based on a result obtained through the sound source localization and the sound source separation performed by the sound source localization and separation step and a result obtained through the identification by the identification step, selecting a separation sound based on a result obtained by estimating the position of the sound source, and generating visualization information by associating the result obtained by estimating the position of the sound source with a kind of a sound signal in accordance with the sound source; and
a step of generating an image in which an image corresponding to the sound source is displayed at the estimated position of the sound source by using the visualization information and the separation sound and generating a sound in which the separation sound is reproduced at the estimated position of the sound source.

* * * * *